(12) United States Patent
Layden et al.

(10) Patent No.: US 12,524,696 B2
(45) Date of Patent: Jan. 13, 2026

(54) NOISE CHARACTERIZATION FOR NON-CLIFFORD QUANTUM GATES

(71) Applicant: International Business Machines Corporation, Armonk, NY (US)

(72) Inventors: David Layden, San Jose, CA (US); Youngseok Kim, Upper Saddle River, NJ (US); Riddhi Swaroop Gupta, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 649 days.

(21) Appl. No.: 18/064,476

(22) Filed: Dec. 12, 2022

(65) Prior Publication Data

US 2024/0169238 A1 May 23, 2024

Related U.S. Application Data

(60) Provisional application No. 63/384,725, filed on Nov. 22, 2022.

(51) Int. Cl.
G06N 10/40 (2022.01)
G06N 10/20 (2022.01)

(52) U.S. Cl.
CPC ............. G06N 10/40 (2022.01); G06N 10/20 (2022.01)

(58) Field of Classification Search
CPC ......... G06N 10/40; G06N 10/20; G06N 10/00
See application file for complete search history.

(56) References Cited

U.S. PATENT DOCUMENTS 8,089,286 B2  1/2012  Silva et al.
9,870,277 B2  1/2018  Berkley
(Continued)

FOREIGN PATENT DOCUMENTS

CN   114997407 A    9/2022
WO   2022129204 A1  6/2022

OTHER PUBLICATIONS

Chausser et al. ("Hybrid benchmarking of arbitrary quantum gates") (Year: 2017).*
(Continued)

Primary Examiner — Walter L Lindsay, Jr.
Assistant Examiner — Geoffrey T Evans
(74) Attorney, Agent, or Firm — Amin, Turocy & Watson, LLP

(57) ABSTRACT

Systems, computer-implemented methods, and/or computer program products to facilitate noise characterization of a two-qubit unitary are provided. A system can comprise a memory that stores computer executable components and a processor that executes the computer executable components stored in the memory. The computer executable components can comprise an execution component that executes a two-qubit quantum circuit comprising a preparation of an initial state for a two-qubit Pauli operator and an application of one or more circuit layers, wherein each circuit layer comprises an application of a pair of random gates each selected from I, X, Y or Z, application of the two-qubit unitary having a rotation angle modified to have a 50% probability of being each of positive and negative, and another application of the first random gate and the second random gate. A fitting component employs curve fitting of an expectation value resulting from the execution.

20 Claims, 13 Drawing Sheets

(56) References Cited

U.S. PATENT DOCUMENTS

| | | | |
|---|---|---|---|
| 10,360,088 | B2 | 7/2019 | Wallman et al. |
| 10,789,123 | B2 | 9/2020 | Joffe et al. |
| 10,838,792 | B1 | 11/2020 | Wallman |
| 11,334,693 | B1 | 5/2022 | Flammia |
| 2021/0099201 | A1* | 4/2021 | Winick .................. G06N 10/20 |
| 2021/0365824 | A1 | 11/2021 | Maslov et al. |
| 2022/0188682 | A1 | 6/2022 | van den Berg et al. |

OTHER PUBLICATIONS

Chen, et al., "Error-Mitigated Simulation of Quantum Many-Body Scars on Quantum Computers with Pulse-Level Control," arXiv preprint arXiv:2203.08291 (arXiv:2203.08291v1 [quant-ph] Mar. 15, 2022).

Layden, et al., "Quantum-enhanced Markov chain Monte Carlo," arXiv preprint arXiv:2203.12497 (arXiv:2203.12497v1 [quant-ph] Mar. 23, 2022).

Erhard, et al., "Characterizing large-scale quantum computers via cycle benchmarking," Nature communications 10, No. 1 (Nov. 25, 2019): 1-7, https://doi.org/10.1038/s41467-019-13068-7.

Van Den Berg, et al., "Probabilistic error cancellation with sparse Pauli-Lindblad models on noisy quantum processors," arXiv preprint arXiv:2201.09866 (arXiv:2201.09866v2 [quant-ph] Jun. 23, 2022).

Temme, et al., "Error mitigation for short-depth quantum circuits." Physical review letters 119, No. 18 (Nov. 3, 2017): 180509.

Earnest, et al., "Pulse-efficient circuit transpilation for quantum applications on cross-resonance-based hardware," Physical Review Research 3, No. 4 (2021): 043088, arXiv:2105.01063v1 [quant-ph] May 3, 2021.

Chen, et al., "The learnability of Pauli noise," arXiv preprint arXiv:2206.06362 (arXiv:2206.06362v1 [quant-ph] Jun. 13, 2022).

Van Den Berg, et al., "Model-free readout-error mitigation for quantum expectation values," Physical Review A 105, No. 3 (2022): 032620, arXiv:2012.09738v1 [quant-ph] Dec. 17, 2020.

Helsen, et al. "Spectral quantum tomography" Nature Partner Journals, 2019, 11 pages.

Cai, et al. "Quantum Error Mitigation" arXiv:2210.00921v3 [quant-ph] Dec. 28, 2023, 43 pages.

Bravyi, et al. "The Future of Quantum Computing with Superconducting Qubits" arXiv:2209.06841v2 [quant-ph] Nov. 28, 2022, 20 pages.

Lloyd, Seth "Universal Quantum Simulators" Science, vol. 273, Aug. 23, 1996, 7 pages.

Childs, et al. "Toward the first quantum simulation with quantum speedup" http://arxiv.org/abs/1711.10980v1 Nov. 29, 2017, 63 pages.

Childs, et al. "Theory of Trotter Error with Commutator Scaling" Physical Review X 11, 011020 (2021), 49 pages.

Clinton, et al. "Hamiltonian Simulation Algorithms for Near-Term Quantum Hardware" arXiv:2003.06886v3 [quant-ph] Aug. 26, 2021, 76 pages.

Earnest, et al. Pulse-efficient circuit transpilation for quantum applications on crossresonance-based hardware arXiv:2105.01063v1 [quant-ph] May 3, 2021, 12 pages.

Stenger, et al. "Simulating the dynamics of braiding of Majorana zero modes using an IBM quantum computer" arXiv:2012.11660v2 [quant-ph] Jan. 26, 2021, 12 pages.

Greenbaum, Daniel "Introduction to Quantum Gate Set Tomography" https://ar5iv.labs.arxiv.org/html/1509.02921, Jan. 4, 2023, 38 pages.

Flammia, et al. "Efficient estimation of Pauli channels" arXiv:1907.12976v3 [quant-ph] Feb. 22, 2022, 31 pages.

Dur, et al. "Standard forms of noisy quantum operations via depolarization" http://arxiv.org/abs/quant-ph/0507134v1, Jul. 14, 2005, 29 pages.

Dankert, et al. Exact and approximate unitary 2-designs and their application to fidelity estimation, Phys. Rev. A 80, 012304 (2009), 6 pages.

Knill, et al. "Fault-Tolerant Postselected Quantum Computation: Threshold Analysis" http://arxiv.org/abs/quant-ph/0404104v1 Apr. 19, 2004, 21 pages.

Wallman, et al. "Noise tailoring for scalable quantum computation via randomized compiling" arXiv:1512.01098v3 [quant-ph] Jun. 9, 2016, 10 pages.

Casella, et al. "Statistical Inference" Duxbury, 2002, 686 pages.

Harper, et al. "Fast Estimation of Sparse Quantum Noise" arXiv:2007.07901v2 [quant-ph] Jul. 31, 2020, 25 pages.

Krantz, et al. "A Quantum Engineer's Guide to Superconducting Qubits" arXiv:1904.06560v5 [quant-ph] Jul. 7, 2021, 67 pages.

Moses, et al. "A Race Track Trapped-Ion Quantum Processor" arXiv:2305.03828v2 [quant-ph] May 16, 2023, 24 pages.

Evered, et al. "High-fidelity parallel entangling gates on a neutral atom quantum computer" arXiv:2304.05420v1 [quant-ph] Apr. 11, 2023, 21 pages.

Van Den Berg, et al. "Model-free readout-error mitigation for quantum expectation values" arXiv:2012.09738v3 [quant-ph] Jan. 27, 2022, 8 pages.

Wallman, et al. "Randomized Benchmarking with Confidence" arXiv:1404.6025v4 [quant-ph] Dec. 17, 2015, 31 pages.

Helsen, et al. "Multi-qubit Randomized Benchmarking Using Few Samples" arXiv:1701.04299v3 [quant-ph] Aug. 19, 2019, 41 pages.

Wack, et al. "Quality, Speed, and Scale: three key attributes to measure the performance of near-term quantum computers" arXiv:2110.14108v2 [quant-ph] Oct. 28, 2021, 8 pages.

Flammia, Steven T. "Averaged circuit eigenvalue sampling" arXiv:2108.05803v1 [quant-ph] Aug. 12, 2021, 6 pages.

Chen, et al. "The learnability of Pauli noise" arXiv:2206.06362v2 [quant-ph] Dec. 23, 2022, 33 pages.

Kimmel, et al. "Robust Extraction of Tomographic Information via Randomized Benchmarking" arXiv:1306.2348v2 [quant-ph] Apr. 11, 2016, 14 pages.

Campbell, Earl "A random compiler for fast Hamiltonian simulation" arXiv:1811.08017v2 [quant-ph] Jun. 25, 2019, 11 pages.

Koczor, et al. "Probabilistic Interpolation of Quantum Rotation Angles" arXiv:2305.19881v2 [quant-ph] Nov. 14, 2023, 15 pages.

"Granet, et al. ""Continuous Hamiltonian dynamics on digital quantum computers without discretization error"" arXiv:2308.03694v2 [quant-ph] Nov. 17, 2023, 8 pages."

Layden, David "Shaping Quantum Channels With Random Pauli Gates" U.S. Appl. No. 18/463,899, filed Sep. 8, 2023, 62 pages.

Layden, et al. "Characterizing Noisy Non-Clifford Gates Through Partial Pauli Twirling or Through Alternating Pauli Twirling" U.S. Appl. No. 18/468,473, filed Sep. 15, 2023, 133 pages.

Layden, et al. "Characterizing Noisy Non-Clifford Gates Through Partial Pauli Twirling or Through Alternating Pauli Twirling" U.S. Appl. No. 18/468,418, filed Sep. 15, 2023, 134 pages.

Li, et al. "Efficient Variational Quantum Simulator Incorporating Active Error Minimization" Physical Review X 7, 021050 (2017), 14 pages.

\* cited by examiner

NOISE CHARACTERIZATION FOR NON-CLIFFORD QUANTUM GATES

TECHNICAL FIELD

The present disclosure relates to quantum circuits, and more particularly to the characterization of noise for quantum gates, such as non-Clifford quantum gates.

BACKGROUND

In quantum computing systems and/or in classical computing systems, quantum circuit depth and/or width, type of quantum gates employed and/or total number of quantum gates employed, can attribute to increased system noise and thus can lead to estimation error in resulting measurements.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or non-transitory computer-readable mediums are described that can facilitate the noise characterization of quantum gates, and particularly of non-Clifford quantum gates, also herein referred to as non-Clifford unitaries.

According to an embodiment, a system can comprise a memory that stores computer executable components; and a processor that executes the computer executable components stored in the memory for determining characterization of noise associated with a two-qubit unitary. The computer executable components comprise an execution component that executes a two-qubit quantum circuit employing a first qubit and a second qubit, the two-qubit quantum circuit comprising a preparation of an initial state for a two-qubit Pauli operator and an application of one or more circuit layers, wherein each circuit layer of the one or more circuit layers comprises an application of a first random gate selected from I, X, Y or Z at the first qubit, an application of a second random gate selected from I, X, Y or Z at the second qubit, application of the two-qubit unitary having a rotation angle, wherein the rotation angle is modified to have a first non-zero probability of being positive and a second non-zero probability of being negative, and another application of the first random gate and the second random gate, and a fitting component that employs curve fitting of a resultant expectation value, of the two-qubit Pauli operator, the resultant expectation value resulting from the execution of the two-qubit quantum circuit.

An advantage of such system can be that the system is state preparation and measurement (SPAM)-robust, and further is compatible with and functions for non-Clifford gates. Such non-Clifford gates are those of $R_{zz}(\Theta)$-type gates for general angles. This can allow for implementation of non-Clifford operations, such as in Trotter and variation circuits, of the form $$U_\theta = \exp(-\frac{i\theta}{2} A \otimes B)$$

for angles $|\theta|\neq\pi/2$ and single-qubit Pauli operators A, B∈{X, Y, Z}.

As used herein, an approach that is unbiased by SPAM errors refers to an approach that can provide a correct result on average despite such errors. That is, SPAM errors do not systematically cause provision of an incorrect result.

As a result of noise characterization provided by the aforementioned system, a quantum circuit employing the two-qubit quantum unitary of interest can be executed with reduced noise, thus allowing for greater accuracy in an output of a quantum circuit employing the two-qubit quantum unitary.

According to another embodiment, a system can comprise a memory that stores computer executable components, and a processor that executes the computer executable components stored in the memory for determining characterization of noise associated with a two-qubit non-Clifford unitary. The computer executable components comprise an execution component that executes a two-qubit quantum circuit employing a first qubit and a second qubit, the two-qubit quantum circuit comprising an application one or more circuit layers, wherein each circuit layer of the one or more circuit layers comprises an application of a first random gate selected from I, X, Y or Z at the first qubit, an application of a second random gate selected from I, X, Y or Z at the second qubit, application of the two-qubit unitary having a rotation angle that is modified to have a 50% probability of being positive and a 50% probability of being negative, and another application of the first random gate and the second random gate. The computer executable components can comprise a measurement component that measures a resultant expectation value of a two-qubit Pauli operator, the resultant expectation value resulting from the execution of the two-qubit quantum circuit, using readout twirling, wherein the two-qubit Pauli operator at least partially defines a diagonal of a matrix at least partially characterizing the noise associated with the two-qubit unitary. The computer executable components can comprise a fitting component that extracts one or more parameters from a curve fitting of the resultant expectation value and uses the one or more parameters to define the diagonal of the matrix.

An advantage of such system can be that the system is state preparation and measurement (SPAM)-robust, and further is compatible with and functions for non-Clifford gates. Such non-Clifford gates are those of $R_{zz}(\Theta)$-type gates for general angles. This can allow for implementation of non-Clifford operations, such as in Trotter and variation circuits, of the form $$U_\theta = \exp(-\frac{i\theta}{2} A \otimes B)$$

for angles $|\theta|\neq\pi/2$ and single-qubit Pauli operators A, B∈{X, Y, Z}.

As a result of noise characterization provided by the aforementioned system, a quantum circuit employing the two-qubit quantum unitary of interest can be executed with reduced noise, thus allowing for greater accuracy in an output of a quantum circuit employing the two-qubit quantum unitary.

According to yet another embodiment, a computer-implemented method for noise characterization of a two-qubit unitary can comprise executing, by a system operatively coupled to at least one processor, a two-qubit quantum circuit employing a first qubit and a second qubit, wherein execution of the two-qubit quantum circuit comprises preparing, by the system, an initial state for a two-qubit Pauli operator, and applying, by the system, one or more circuit layers. Applying each circuit layer of the one or more circuit layers comprises applying, by the system, a first random gate selected from I, X, Y or Z at the first qubit, applying, by the system, a second random gate selected from I, X, Y or Z at the second qubit, applying, by the system, the two-qubit unitary having a rotation angle, modifying, by the system, the rotation angle to have a first non-zero probability of being positive and a second non-zero probability of being negative, and again applying, by the system, the first random gate and the second random gate. The method further comprises curve fitting, by the system, a resultant expectation value, of the two-qubit Pauli operator, the resultant expectation value resulting from the execution of the two-qubit quantum circuit.

An advantage of such method can be that the method is state preparation and measurement (SPAM)-robust, and further is compatible with and functions for non-Clifford gates. Such non-Clifford gates are those of $R_{zz}(\Theta)$-type gates for general angles. This can allow for implementation of non-Clifford operations, such as in Trotter and variation circuits, of the form $$U_\theta = \exp(-\frac{i\theta}{2} A \otimes B)$$

for angles $|\theta| \neq \pi/2$ and single-qubit Pauli operators A, B $\in$ {X, Y, Z}.

As a result of noise characterization provided by the aforementioned system, a quantum circuit employing the two-qubit quantum unitary of interest can be executed with reduced noise, thus allowing for greater accuracy in an output of a quantum circuit employing the two-qubit quantum unitary.

In accordance with still another embodiment, a computer-program product facilitating a process for noise characterization of a two-qubit unitary can comprise a computer readable storage medium having program instructions embodied therewith. The program instructions can be executable by a processor to cause the processor to execute, by the processor, a two-qubit quantum circuit employing a first qubit and a second qubit, comprising applying, by the processor, one or more circuit layers. Applying each circuit layer of the one or more circuit layers can comprise applying, by the processor, a first random gate selected from I, X, Y or Z at the first qubit, applying, by the processor, a second random gate selected from I, X, Y or Z at the second qubit, applying, by the processor, the two-qubit unitary having a rotation angle that is modified to have a 50% probability of being positive and a 50% probability of being negative, and again applying, by the processor, the first random gate and the second random gate. The program instructions are executable by the processor to further cause the processor to measure, by the processor, a resultant expectation value of a two-qubit Pauli operator, the resultant expectation value resulting from the execution of the two-qubit quantum circuit, using readout twirling, wherein the two-qubit Pauli operator at least partially defines a diagonal of a matrix at least partially characterizing the noise associated with the two-qubit unitary.

An advantage of such computer-program product can be that the system is state preparation and measurement (SPAM)-robust, and further is compatible with and functions for non-Clifford gates. Such non-Clifford gates are those of $R_{zz}(\Theta)$-type gates for general angles. This can allow for implementation of non-Clifford operations, such as in Trotter and variation circuits, of the form $$U_\theta = \exp(-\frac{i\theta}{2} A \otimes B)$$

for angles $|\theta| \neq \pi/2$ and single-qubit Pauli operators A, B $\in$ {X, Y, Z}.

As a result of noise characterization provided by the aforementioned system, a quantum circuit employing the two-qubit quantum unitary of interest can be executed with reduced noise, thus allowing for greater accuracy in an output of a quantum circuit employing the two-qubit quantum unitary.

DETAILED DESCRIPTION

Figure 1:
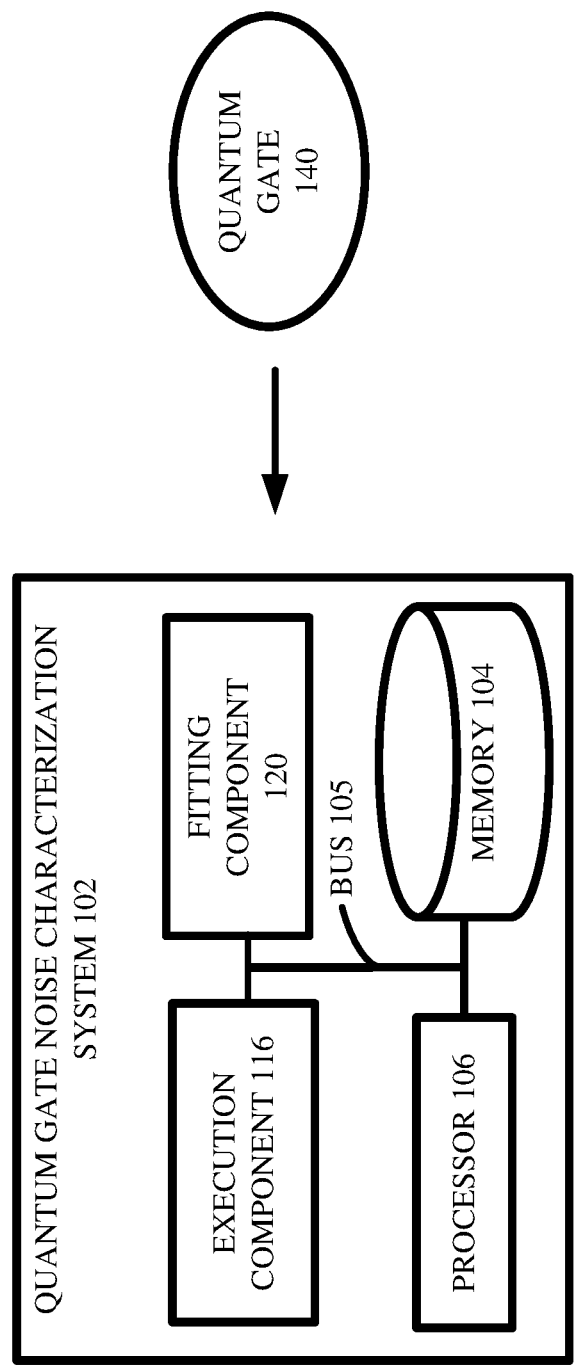
FIG. 1 illustrates a block diagram of an example, non-limiting system that can facilitate noise characterization of a two-qubit quantum unitary, in accordance with one or more embodiments described herein.

The following detailed description is merely illustrative and is not intended to limit embodiments, application and/or uses of embodiments. Furthermore, there is no intention to be bound by any expressed and/or implied information presented in the preceding Background and/or Summary sections, and/or in this Detailed Description section.

Qubit states can only exist (or can only be coherent) for a limited amount of time. Thus, an objective of operation of a quantum logic circuit (e.g., including one or more qubits) can be to maximize the utilization of the coherence time of the employed qubits. Time spent operating the quantum logic circuit can undesirably reduce the available time of operation on one or more qubits. This can be due to the available coherence time of the one or more qubits prior to decoherence of the one or more qubits. For example, a qubit state can be lost in less than 100 to 200 microseconds in one or more cases.

Operation of the quantum circuit on a quantum system can be supported, such as by a pulse component (also herein referred to as a waveform generator), to produce one or more physical pulses and/or other waveforms, signals and/or frequencies to alter one or more states of one or more of the physical qubits. The altered states can be measured, thus allowing for one or more computations to be performed regarding the qubits and/or the respective altered states.

Operations on qubits generally can introduce some error, such as some level of decoherence and/or some level of quantum noise, further affecting qubit availability. Quantum noise can refer to noise attributable to the discrete and/or probabilistic natures of quantum interactions. Noise in two-qubit gates can be a limiting source of error in existing quantum computers.

That is, in actual hardware, most quantum gates are implemented imperfectly. Mathematically, an imperfect quantum gate can always be decomposed as a perfect gate followed by a quantum channel describing all the imperfections, which we collectively refer to as noise. The noise on single-qubit gates is typically much weaker than that on two-qubit gates, so it can be typical to approximate single-qubit gates as being noiseless. That is, introduction of noise is most-always inherent when operating a two-qubit gate.

Such noise can be attempted to be lowered by an error-mitigation scheme. Existing error-mitigation schemes, such as probabilistic error cancellation, depend on being able to characterize gate noise in a state preparation and measurement (SPAM)-robust way. Unfortunately, however, such existing noise characterization methods are therefore compatible only with Clifford gates.

On the other hand, many quantum circuits that can be employed, such as Trotter circuits and variational circuits, differently call for gates of the form $R_{zz}(\Theta)$ for general angles θ. These gates can be implemented natively in experiments, which can be less noisy than implementation of these gates through alternative sequences of Clifford gates. However, such native implementation still incurs some gate noise that can disturb measurements, causing measurement error, reduction in output accuracy of an executed quantum circuit and/or reduce usable coherent time of excited qubits.

Because the native implementation is generally non-Clifford, it has been incompatible with existing error-mitigation schemes such as probabilistic error cancellation (PEC), probabilistic error amplification (PEA) and related schemes. This is largely because existing error-mitigation schemes do not comprise a SPAM-robust way to characterize noise on non-Clifford gates.

To address one or more of the aforementioned deficiencies of existing error-mitigation frameworks, one or more frameworks discussed herein can be employed to characterize noise in a quantum gate, such as a non-Clifford gate, also herein referred to as a non-Clifford unitary. Such noise characterization can be employed, once determined, in various ways, such as to mitigate such noise during execution of a quantum circuit employing the non-Clifford unitary and/or to mitigate such noise relative to measurement readout of such quantum circuit.

Because the one or more frameworks discussed herein can address noise characterization of non-Clifford unitaries, such one or more frameworks can be employed for various quantum problems, such as comprising common quantum algorithms, such as variational quantum eigen-solvers (VQEs), quantum approximate optimization algorithms (QAOAs), Trotter Formulae and/or circuit transpilation.

That is, generally, embodiments of devices, systems, computer-implemented methods and/or computer program products to be discussed herein can be used relative to implementation of non-Clifford operations of the form $$U_\theta = \exp(-\frac{i\theta}{2} A \otimes B)$$

for angles $|\theta| \neq \pi/2$ and single-qubit Pauli operators A, B∈{X, Y, Z}. As mentioned above, such gates $U_\theta$ can be implemented natively, or by decomposing such gates $U_\theta$ into two-qubit Clifford gates (in addition to single-qubit gates which can be nearly noiseless by comparison to the two-qubit Clifford gates). While the former (native) approach typically can involve less gate noise than the latter (Clifford decomposition) it is desirable to characterize such lower noise to even further be able to mitigate such noise.

Generally, the one or more frameworks discussed herein can comprise twirling such non-Clifford gate noise by randomly compiling the non-Clifford gate, characterizing the twirled noise, and then effectively reversing the twirled noise using the characterization.

The one or more frameworks discussed herein can perform the noise characterization generally through a process comprising preparing an initial state, running a quantum circuit, measuring an expectation value based on a result of the quantum circuit, curve fitting the expectation value, and compiling plural curve-fitted expectation values to define a diagonal of a matrix E characterizing the noise, all relative to a gate of interest, such as a non-Clifford gate of interest.

As used herein, a Clifford unitary can refer to a unitary that can comprise only Clifford gates, such as I, X, Y, Z, S, S†, CZ, CNOT and/or Swap Gate. Put another way, a Clifford gate can refer to a unitary matrix U with the property that if P is an n-qubit Pauli, then $UPU^\dagger$ is also an n-qubit Pauli.

A Pauli, also herein referred to as a Pauli matrix or Pauli operator, can refer to a matrix that spans the space of observables of the complex two-dimensional Hilbert space. X, Y and Z can be used to denote Pauli $\sigma_x$, $\sigma_y$ and $\sigma_z$ matrices, respectively. An n-qubit Pauli can thus be an n-fold tensor product of I, X, Y and Z. Any two n-qubit Paulis $P_1$ and $P_2$ either can commute, where $[P_1, P_2]=P_1 P_2-P_2P_1=0$, or anti-commute, where $\{P_1, P_2\}=P_1 P_2+P_2P_1=0$.

As used herein, a non-Clifford unitary can refer to a unitary of the form $$U_\theta = \exp(-\frac{i\theta}{2} A \otimes B)$$

for angles $|\theta|\neq\pi/2$ and single-qubit Pauli operators A, B∈{X, Y, Z}.

As used herein, a quantum circuit can be a set of operations, such as gates, performed on a classical system and/or on a quantum system.

A quantum system can have a set of real-world physical qubits with the purpose of obtaining one or more qubit measurements.

A quantum processor can comprise the one or more real-world physical qubits.

As used herein, the term "cost" can refer to money, power, memory, bandwidth, time and/or labor.

As used herein, the terms "entity," "requesting entity," and "user entity" can refer to a machine, device, component, hardware, software, smart device and/or human.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100, 200 and/or 300 illustrated at FIGS. 1, 2 and/or 3, and/or systems thereof, can further comprise one or more computer and/or computing-based elements described herein with reference to an operating environment, such as the operating environment 1300 illustrated at FIG. 13. In one or more described embodiments, computer and/or computing-based elements can be used in connection with implementing one or more of the systems, devices, components and/or computer-implemented operations shown and/or described in connection with FIGS. 1, 2 and/or 3 and/or with other figures described herein.

Turning now in particular to one or more figures, and first to FIG. 1, the figure illustrates a block diagram of an example, non-limiting system 100 that can facilitate quantum gate noise characterization, of one or more quantum gates (e.g., non-Clifford gates) at least partially in parallel with one another, in accordance with one or more embodiments described herein.

The non-limiting system 100 can comprise a quantum gate noise characterization system 102, which can be associated with a cloud computing environment. The quantum gate noise characterization system 102 can comprise one or more components, such as a memory 104, processor 106, bus 105, execution component 116 and/or fitting component 120. Generally, quantum gate noise characterization system 102, and thus non-limiting system 100, can facilitate characterization of quantum noise inherent in execution of a quantum gate $U_\theta$ (140). The quantum gate 140 can be defined by the form $$U_\theta = \exp(-\frac{i\theta}{2} A \otimes B)$$

for angles $|\theta|\neq\pi/2$ and single-qubit Pauli operators A, B∈{X, Y, Z}, where i is the square root of −1.

Generally, the execution component 116 can execute a two-qubit quantum circuit employing a first qubit and a second qubit, the two-qubit quantum circuit comprising a preparation of an initial state for a two-qubit Pauli operator and an application of one or more circuit layers. Each circuit layer of the one or more circuit layers can comprise an application of a first random gate selected from I, X, Y or Z at the first qubit, an application of a second random gate selected from I, X, Y or Z at the second qubit, an application of the two-qubit unitary having a rotation angle, wherein the rotation angle is modified to have a first non-zero probability of being positive and a second non-zero probability of being negative, and another application of the first random gate and the second random gate.

Applying the first random gate and the second random gate, and again applying the first random gate and the second random gate, can each take the form of $M_1^{(i)} \otimes M_2^{(i)}$.

As used herein, the two-qubit Pauli operator can be one of a set of all 16 possible Pauli operators from combination of I, X, Y or Z at the first qubit and I, X, Y or Z at the second qubit.

The fitting component 120 can employ curve fitting of a resultant expectation value, of the two-qubit Pauli operator, resulting from the execution of the two-qubit quantum circuit as performed by the execution component 116. As a result, the fitting can be employed to at least partially characterize gate noise associated with the quantum gate 140, for the selected two-qubit Pauli operator.

Figure 2:
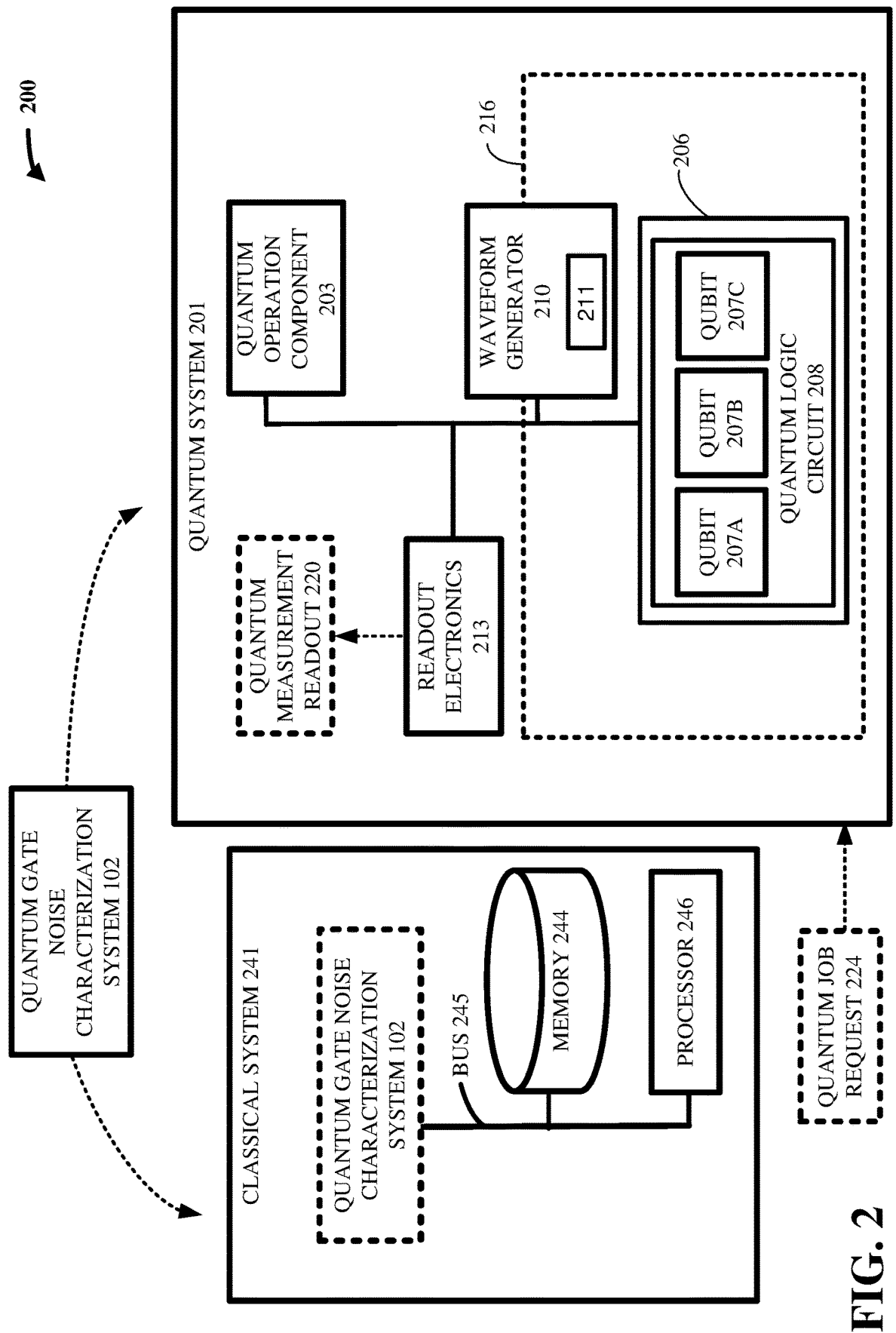
FIG. 2 illustrates a diagram of another example, non-limiting system that can facilitate noise characterization of a two-qubit quantum unitary, in accordance with one or more embodiments described herein.

Turning next to FIG. 2, a non-limiting system 200 is illustrated that can comprise the quantum gate noise characterization system 102 of FIG. 1. Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise a classical system 241 that can be employed with or without a quantum system, such as the quantum system 201. The classical system 241, can comprise components, such as a memory 244, processor 246 and/or bus 245. The quantum gate noise characterization system 102 can be at least partially comprised by and/or be external to the classical system 241. In one or more embodiments, the memory 244 and/or processor 246 can be omitted, and instead the memory 104 and/or processor 106 can be employed. In one or more embodiments, the quantum gate noise characterization system 102 can employ the memory 244 and/or processor 246 and the memory 104 and/or processor 106 can be omitted.

In one or more embodiments, the quantum gate noise characterization system 102 can be comprised be at least partially comprised by and/or be external to the quantum system 201.

In one or more embodiments, the non-limiting system 200 can be a hybrid system and thus can include both a quantum system and a classical system, such as the quantum system 201 and the classical-based system 241 (also herein referred to as a classical system 241). In one or more embodiments, one or more components of the quantum system 201, such as the readout electronics 213, can be at least partially comprised by the classical system 241, or otherwise comprised external to the quantum system 201. In one or more embodiments, one or more components of the classical system 241 can be at least partially comprised by the quantum system 201, or otherwise comprised external to the classical system 241.

One or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The classical system 202 and/or the quantum system 201 can be associated with, such as accessible via, a cloud computing environment such that aspects of classical processing can be distributed between the classical system 241 and the cloud computing environment.

Turning now to the quantum system 201, generally based on a quantum job request 224, such as comprising a quantum circuit to be executed (e.g., resulting from use of the quantum gate noise characterization system 102), the quantum operation component 203 and/or quantum processor 206 can direct execution of the quantum circuit to be executed at the quantum logic circuit 208. For example, the quantum circuit to be executed can comprise one or more non-Clifford gates for which noise characterization is desired. Such noise characterization can have been already performed and/or can be performed at least partially prior to execution of the quantum circuit to be executed.

Generally, the quantum system 201 (e.g., quantum computer system and/or superconducting quantum computer system) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement readout 220, can be responsive to the quantum job request 224 and associated input data and can be based at least in part on the input data, quantum functions and/or quantum computations.

In one or more embodiments, the quantum system 201 can comprise components, such as a quantum operation component 203, a quantum processor 206, pulse component 210 (e.g., a waveform generator) and/or the readout electronics 213. In one or more other embodiments, the readout electronics 213 can be comprised at least partially by the classical system 241 and/or be external to the quantum system 201. The quantum processor 206 can comprise the quantum logic circuit 208 comprising one or more, such as plural, qubits 207. Individual qubits 207A, 207B and 207C, for example, can be fixed frequency and/or single junction qubits, such as transmon qubits.

The quantum processor 206 can be any suitable processor. The quantum processor 206 can generate one or more instructions for controlling the one or more processes of the quantum operation component 203 and/or for controlling the quantum logic circuit 208.

The quantum operation component 203 can obtain (e.g., download, receive and/or search for) a quantum job request 224 requesting execution of one or more quantum programs and/or a physical qubit layout. The quantum job request 224 can be provided in any suitable format, such as a text format, binary format and/or another suitable format. In one or more embodiments, the quantum job request 224 can be received by a component other than of the quantum system 201, such as a by a component of the classical system 241 or the quantum gate noise characterization system 102.

The quantum operation component 203 can determine one or more quantum logic circuits, such as based on use of the quantum gate noise characterization system 102, for executing a quantum program. In one or more embodiments, the quantum operation component 203 and/or quantum processor 206 can direct the waveform generator 210 to generate one or more pulses 211, tones and/or waveforms to affect one or more qubits 207.

The waveform generator 210 can generally perform one or more quantum processes, calculations and/or measurements for shifting the frequency of one or more qubits 207, such as when in respective excited states. For example, the waveform generator 210 can operate one or more qubit effectors, such as qubit oscillators, harmonic oscillators and/or pulse generators to cause one or more pulses to stimulate and/or manipulate the state of the one or more qubits 207 comprised by the quantum system 201.

The quantum logic circuit 208 and a portion or all of the waveform generator 210 can be contained in a cryogenic environment, such as generated by a cryogenic chamber 216, such as comprising a dilution refrigerator. Indeed, a signal can be generated by the waveform generator 210 to affect one or more of the plurality of qubits 207. Where the plurality of qubits 207 are superconducting qubits, cryogenic temperatures, such as about 4 Kelvin (K) or lower can be employed for function of these physical qubits. Accordingly, one or more elements of the readout electronics 213 also can be constructed to perform at such cryogenic temperatures. That is, the readout electronics 213, or at least a portion thereof, can be contained in the cryogenic chamber 216.

The readout electronics 213 can be employed to read a state, frequency and/or other characteristic of qubit, excited, decaying or otherwise of the plurality of qubits 207 of the quantum logic circuit 208.

Turning now to further description of the classical system 241, generally, the classical system 241 can comprise any suitable type of component, machine, device, facility, apparatus and/or instrument that comprises a processor and/or can be capable of effective and/or operative communication with a wired and/or wireless network. All such embodiments are envisioned. For example, the classical 241 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the classical system 241 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

In one or more embodiments, the classical system 241 can comprise the processor 246 (e.g., computer processing unit, microprocessor, classical processor, quantum processor and/or like processor). In one or more embodiments, a component associated with qubit reset system 241, as described herein with or without reference to the one or more figures of the one or more embodiments, can comprise one or more computer and/or machine readable, writable and/or executable components and/or instructions that can be executed by processor 246 to provide performance of one or more processes defined by such one or more components and/or instructions.

In one or more embodiments, the computer-readable memory 244 can be operably connected to the processor 246. The memory 244 can store computer-executable instructions that, upon execution by the processor 246, can cause the processor 246 to perform one or more actions.

Figure 3:
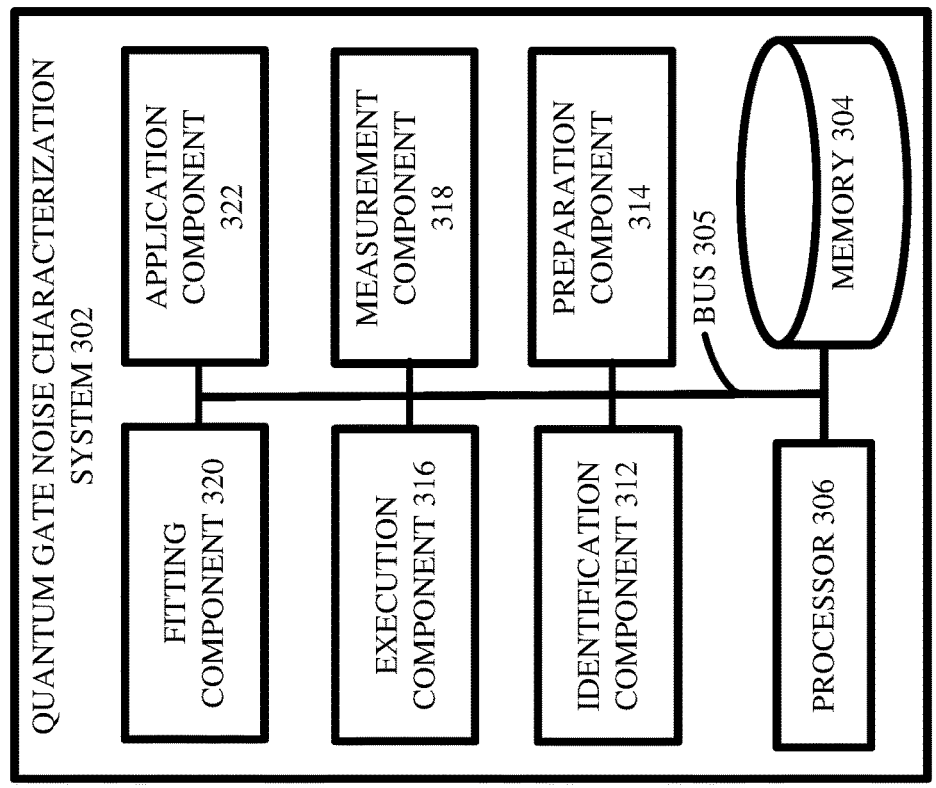
FIG. 3 illustrates a diagram of yet another example, non-limiting system that can facilitate noise characterization of a two-qubit quantum unitary, in accordance with one or more embodiments described herein.

Turning now to FIG. 3, illustrated is a non-limiting system 300 comprising another embodiment of a quantum gate noise characterization system 302. Repetitive description of like elements and/or processes employed in respective embodiments is omitted for sake of brevity. As indicated previously, description relative to an embodiment of FIG. 1 or 2 can be applicable to an embodiment of FIG. 3. Likewise, description relative to an embodiment of FIG. 3 can be applicable to an embodiment of FIG. 1 or 2.

One or more communications between one or more components of the non-limiting system 300 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The quantum gate noise characterization system 302 can be associated with, such as accessible via, a cloud computing environment.

The quantum gate noise characterization system 302 can comprise a plurality of components. The components can include a memory 304, processor 306, bus 305, identification component 312, identification component 314, execution component 316, measurement component 318, fitting component 320 and/or application component 322.

Generally, the quantum gate noise characterization system 302 can obtain a quantum gate 340 (e.g., a non-Clifford gate) and provide at least a partial definition of noise characterization of quantum gate noise associated with execution of that quantum gate 340, execution of one or more processes and/or operations of the quantum gate noise characterization system 302.

Discussion first turns briefly to the processor 306, memory 304 and bus 305 of the quantum gate noise characterization system 302. For example, in one or more embodiments, the quantum gate noise characterization system 302 can comprise the processor 306 (e.g., computer processing unit, microprocessor, classical processor, quantum processor and/or like processor). In one or more embodiments, a component associated with quantum gate noise characterization system 302, as described herein with or without reference to the one or more figures of the one or more embodiments, can comprise one or more computer and/or machine readable, writable and/or executable components and/or instructions that can be executed by processor 306 to provide performance of one or more processes defined by such one or more component and/or instruction. In one or more embodiments, the processor 306 can comprise the identification component 312, identification component 314, execution component 316, measurement component 318, fitting component 320 and/or application component 322.

In one or more embodiments, the quantum gate noise characterization system 302 can comprise the computer-readable memory 304 that can be operably connected to the processor 306. The memory 304 can store computer-executable instructions that, upon execution by the processor 306, can cause the processor 306 and/or one or more other components of the quantum gate noise characterization system 302 (e.g., identification component 312, identification component 314, execution component 316, measurement component 318, fitting component 320 and/or application component 322) to perform one or more actions. In one or more embodiments, the memory 304 can store computer-executable components (e.g., identification component 312, identification component 314, execution component 316, measurement component 318, fitting component 320 and/or application component 322).

The quantum gate noise characterization system 302 and/or a component thereof as described herein, can be communicatively, electrically, operatively, optically and/or otherwise coupled to one another via a bus 305. Bus 305 can comprise one or more of a memory bus, memory controller, peripheral bus, external bus, local bus, quantum bus and/or another type of bus that can employ one or more bus architectures. One or more of these examples of bus 305 can be employed.

In one or more embodiments, the quantum gate noise characterization system 302 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the quantum gate noise characterization system 302 and/or of the non-limiting system 300 can reside in the cloud, and/or can reside locally in a local computing environment (e.g., at a specified location).

In addition to the processor 306 and/or memory 304 described above, the quantum gate noise characterization system 302 can comprise one or more computer and/or machine readable, writable and/or executable components and/or instructions that, when executed by processor 306, can provide performance of one or more operations defined by such one or more components and/or instructions.

Turning now to the additional components of the quantum gate noise characterization system 302 (e.g., identification component 312, identification component 314, execution component 316, measurement component 318, fitting component 320 and/or application component 322), generally, the quantum gate noise characterization system 302 can perform a set of iterative operations on operators of the quantum circuit to provide revised operators comprising reduced depth and/or width.

Turning first to the identification component 312, this component can identify, search, receive, transfer and/or otherwise obtain the quantum gate 340 for which noise characterization is being sought.

Figure 4:
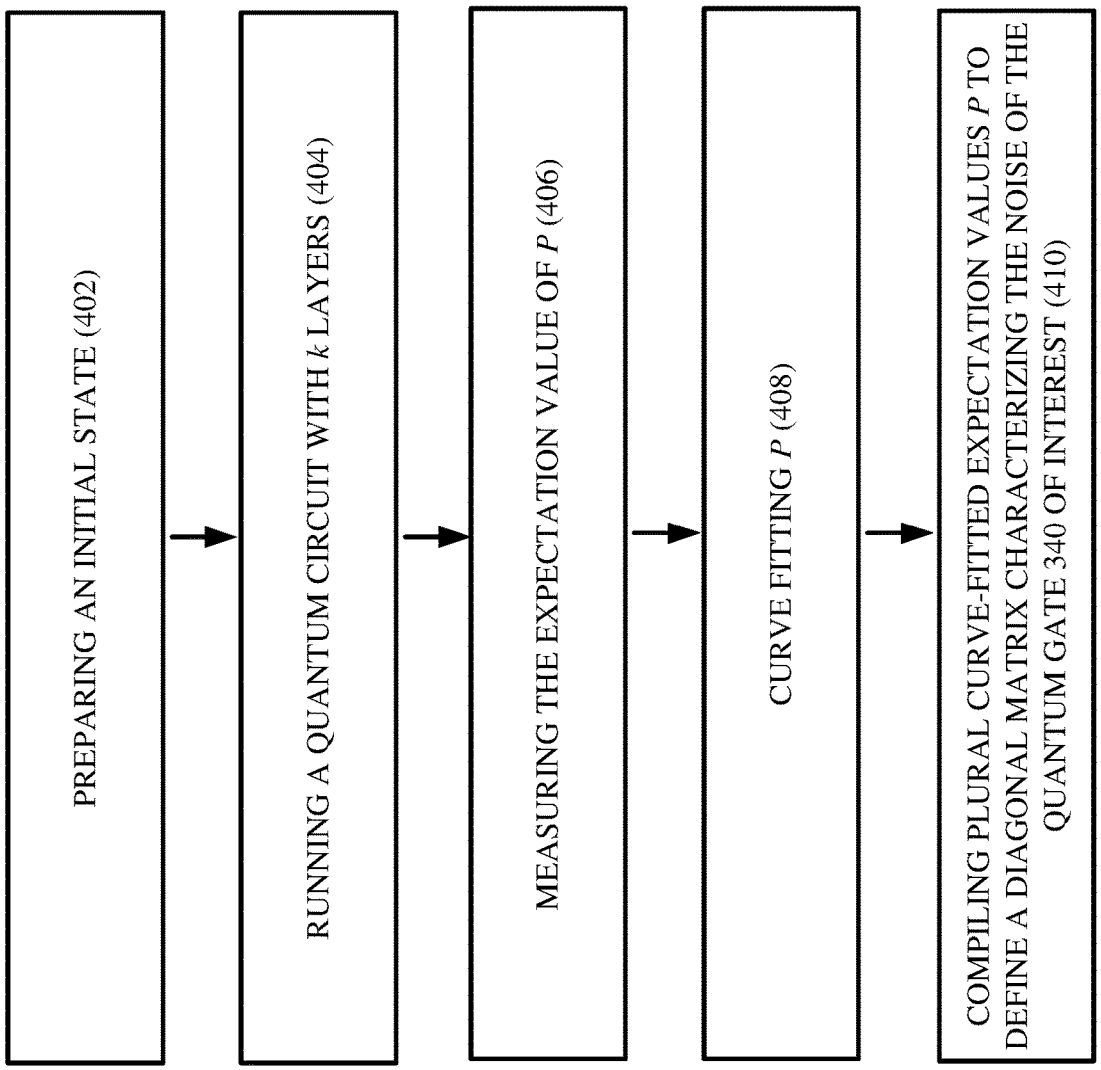
FIG. 4 illustrates a schematic diagram of example operations that can be performed by the unitary noise characterization system of FIG. 3, in accordance with one or more embodiments described herein.

Turning now to FIG. 4, in addition still to FIG. 3, a schematic 400 is illustrated comprising a set of operations that can be performed by the preparation component 314, execution component 316, measurement component 318 and/or fitting component 320 of the quantum gate noise characterization system 302. As illustrated, the set of operations can generally comprise, at a high level, X. Each of these operations, and thus operation of each of the preparation component 314, execution component 316, measurement component 318 and fitting component 320 is be described below.

Figure 5:
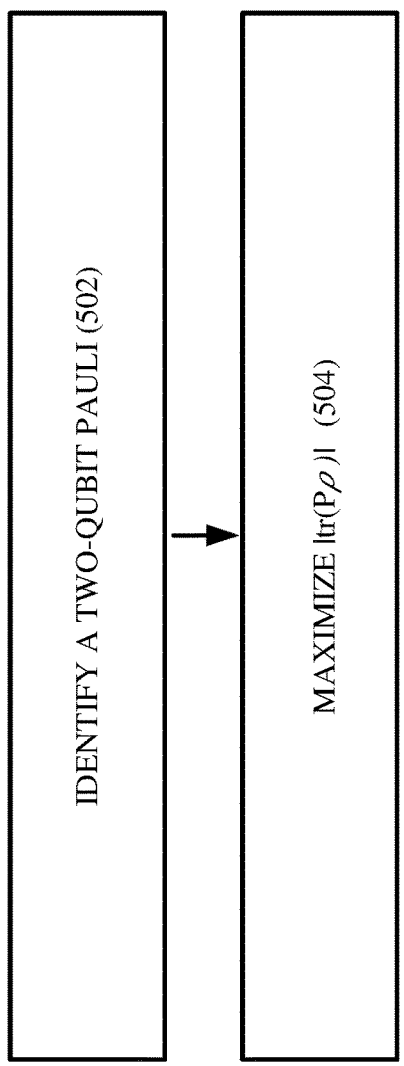
FIG. 5 illustrates another schematic diagram of example operations that can be performed by the unitary noise characterization system of FIG. 3, in accordance with one or more embodiments described herein.

Turning first to the preparation component 314 at FIG. 3 and also to the preparation of the initial state 500 at FIG. 5, the preparation component 314 can generally prepare the initial state ρ for a two-qubit Pauli operator being an element (e.g., one of) a set of sixteen two-qubit Pauli operators comprising all combinations of $\{I, X, Y, Z\} \otimes \{I, X, Y, Z\}$ (e.g., in connection with step 402 of FIG. 4). It is noted that gate noise associated with execution of the randomly-compiled quantum gate 140 can be described by sixteen numbers $\lambda_P$, each of which is associated with a unique two-qubit Pauli operator P. The sixteen numbers $\lambda_P$ are eigenvalues of the noise, each of which is associated with a two-qubit Pauli which is the corresponding eigenvector. Each of these two-qubit Pauli operators P can be represented by the equation $P = P_1 \otimes P_2 \in \{I, X, Y, Z\}^{\otimes 2}$.

As illustrated at FIG. 5, preparation 500 can comprise first identifying one of the sixteen two-qubit Pauli operators at step 502. Next, at step 504, the initial state p can be prepared having a nonzero expectation value: $tr(P \rho) \neq 0$. In one or more embodiments, an initial state producing a large expectation value (in absolute value), $|tr(P \rho)|$, can be preferred since it will give a more precise estimate of $\lambda_P$. Accordingly, a state can be identified and/or generated that maximizes $|tr(P \rho)|$. In one or more embodiments, an experimentally convenient choice that maximizes $|tr(P \rho)|$ is the pure, separable state $\rho = |\psi\rangle\langle\psi|$ for $|\psi\rangle = |_1\rangle |\psi_2\rangle$, where $|\psi_1\rangle$ is an eigenstate of $P_1$ and $|\psi_2\rangle$ is an eigenstate of $P_2$.

Figure 6:
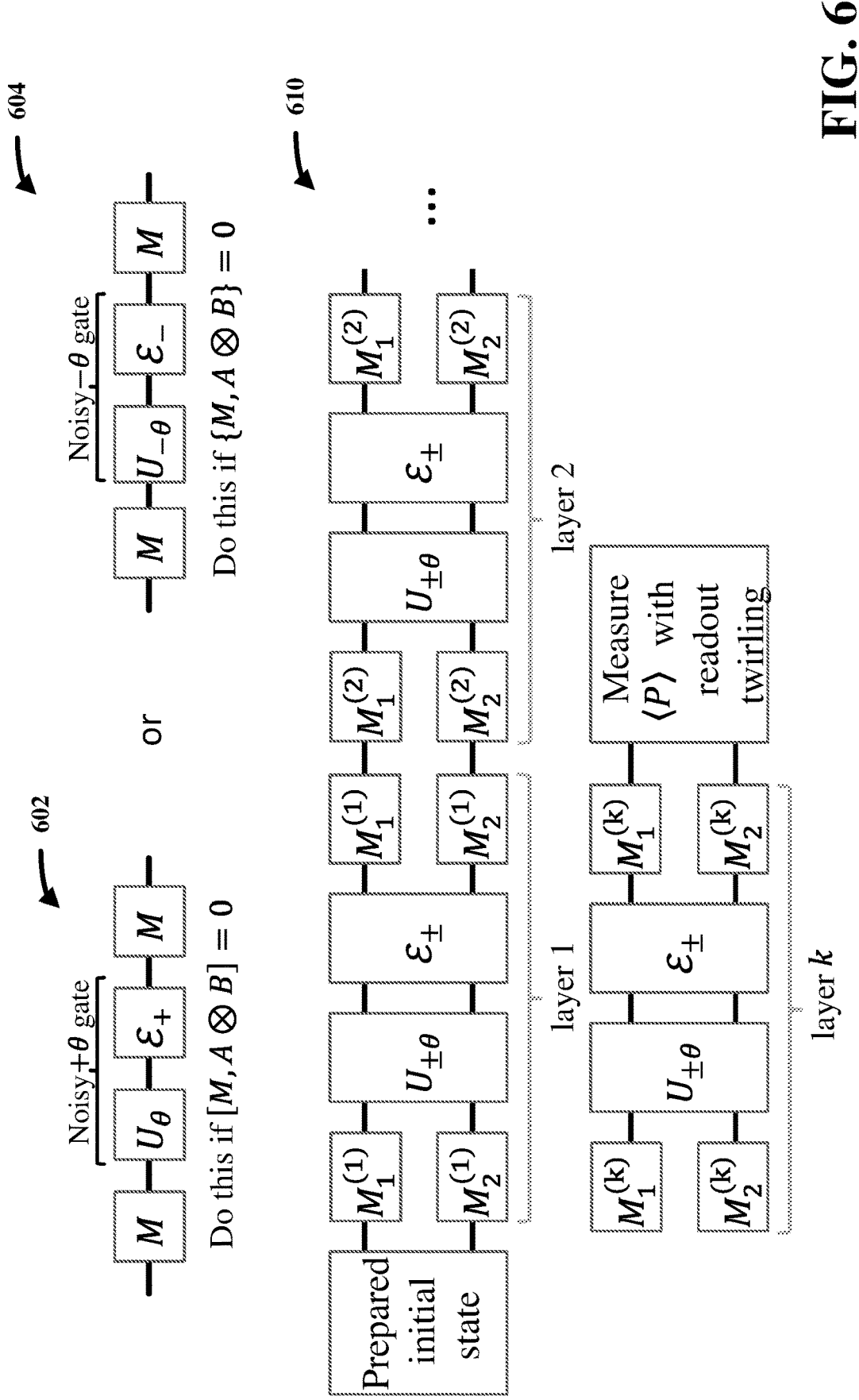
FIG. 6 illustrates quantum circuit representations that can be employed by the unitary noise characterization system of FIG. 3, in accordance with one or more embodiments described herein.
Figure 7:
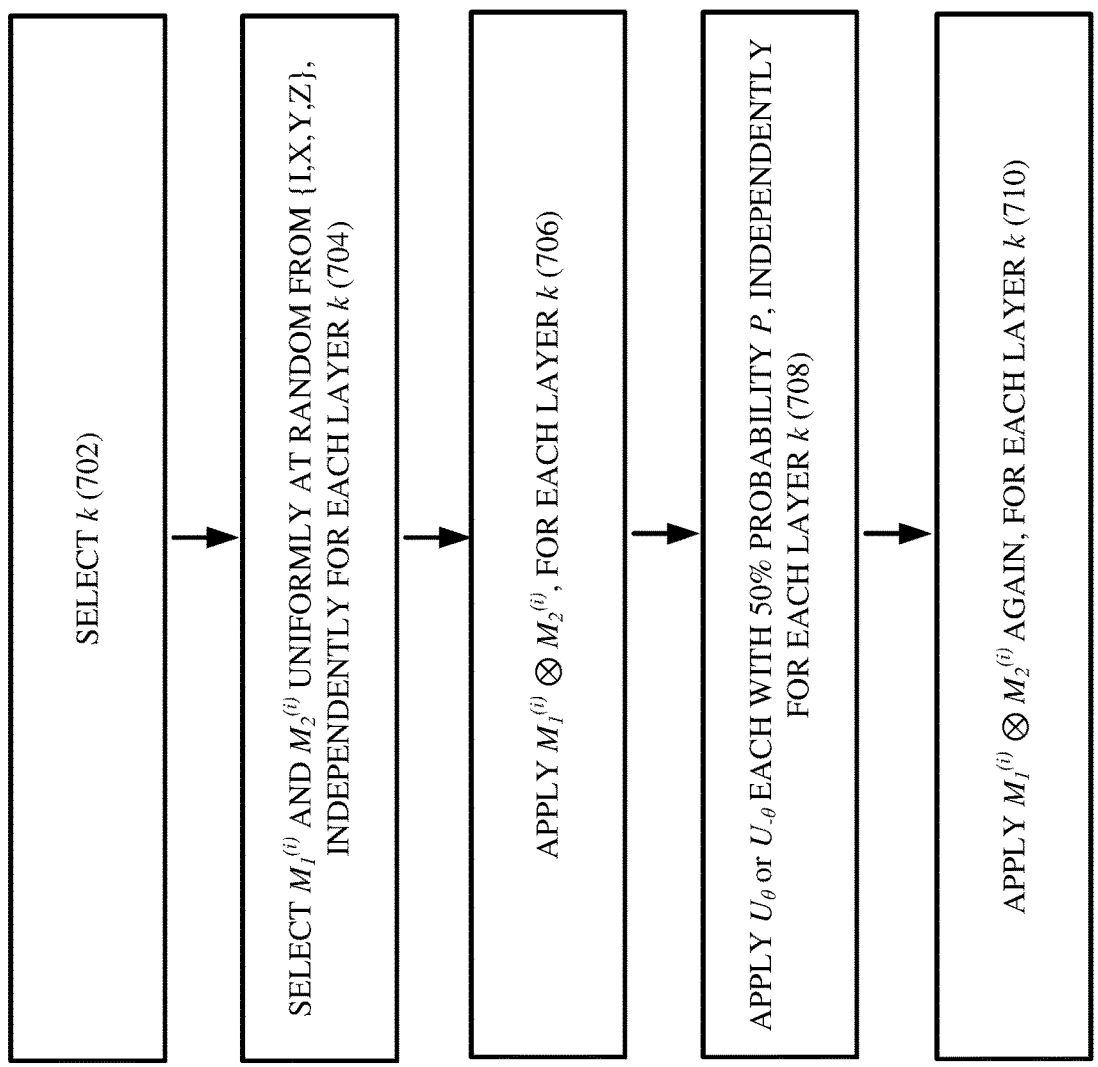
FIG. 7 illustrates yet another schematic diagram of example operations that can be performed by the unitary noise characterization system of FIG. 3, in accordance with one or more embodiments described herein.

Turning next to the execution component 316 at FIG. 3, to the quantum circuit representations 600 at FIG. 6, and also to the quantum circuit execution 700 at FIG. 7, the execution component 316 can generally execute a two-qubit quantum circuit employing a first qubit and a second qubit (e.g., in connection with step 404 of FIG. 4).

The two-qubit quantum circuit (e.g., 610) can comprise an application of the initial state p for the two-qubit Pauli operator P and an application of one or more circuit layers. That is after application of the initial state ρ, each of the one or more circuit layers can be executed/applied at the two-qubits being employed.

The number k of one or more circuit layers can be chosen (e.g., step 702) to allow for a good enough fit of an expectation value of P resulting from execution of the two-qubit quantum circuit represented by the circuit diagram 610. In use, k can be chose as a positive integer that is gradually increased (in different iterations as explained below) until a respective decay curve is qualitatively determined. How large k is increased to can depend on how strong the noise is that is being characterized. Weaker noise can require larger k to qualitatively determine the respective decay curve. Further, with improved hardware and weaker noise, k likewise can be increased to qualitatively determine the respective decay curve.

Generally, for each circuit layer, each individual qubit can be represented by either partial circuit diagram 602 or partial circuit diagram 604.

That is, each circuit layer i of the one or more circuit layers comprises an application of a first random gate selected from I, X, Y or Z at the first qubit and an application of a second random gate selected from I, X, Y or Z at the second qubit. These applications can be performed by first picking $M_1^{(i)}$ and $M_2^{(i)}$ uniformly at random from $\{I, X, Y, Z\}$, where $i \in \{1, \ldots, k\}$ (e.g., step 704). An aggregation of these applications can be represented by $M_1^{(i)} \otimes M_2^{(i)}$. Here, the term "uniformly" refers to an equal probability of each element from $\{I, X, Y, Z\}$ being selected.

After application of $M_1^{(i)} \otimes M_2^{(i)}$ (e.g., step 706), the execution component 316 can perform an application of the two-qubit unitary 340 ($U_\theta$) having a rotation angle, wherein the rotation angle is modified to have a first non-zero probability of being positive and a second non-zero probability of being negative. In one or more embodiments, the first non-zero probability can be 50% and the second non-zero probability can be 50%. That is, after application of $M_1^{(i)} \otimes M_2^{(i)}$, the execution component 316 can perform an application of either $U_\theta$ or $U_{-\theta}$ each with 50% probability (e.g., step 708). This probability is chosen independently (e.g., can be different) for each layer i.

It is noted that at circuit diagram 610, $\varepsilon_\pm$ represents the gate noise caused by the execution of $U_{\pm\theta}$ and which is thus inherent in the application of $U_{\pm\theta}$. More particularly, $\varepsilon_\pm$ represents the noise channel for the gates $U_{\pm\theta}$. That is, $\varepsilon_\pm$ is not actively applied, but rather is naturally applied as part of application of $U_{\pm\theta}$.

It also is noted that for explanation purposes, separate from the steps of the overall noise characterization method 400 and separate from the quantum circuit execution process 700, $\varepsilon_{avg} = (\varepsilon_+ + \varepsilon_-)/2$ can be the average of the two noise channels $\varepsilon_+$ and $\varepsilon_-$, and $\varepsilon_{\text{diff}}=(\varepsilon_+-\varepsilon_-)/2$ can define the difference of the two noise channels $\varepsilon_+$ and $\varepsilon_-$. The net effect of this approach can be to realize the unitary $U_\theta$ followed by a noise channel $\tilde{\varepsilon}_{avg}+\tilde{\varepsilon}_{\text{diff}}$, which we call the twirled noise, where $$\tilde{\mathcal{E}}_{avg}(\rho) = \frac{1}{16}\sum_{M\in P_2} M\mathcal{E}_{avg}(M\rho M)M$$

represents a Pauli channel and $$\tilde{\mathcal{E}}_{\text{diff}}(\rho) = \frac{1}{16}\sum_{M\in P_2}(-1)^{f(M)}M\mathcal{E}_{\text{diff}}(M\rho M)M$$

represents a non-Pauli channel. For $\tilde{\varepsilon}_{\text{diff}}(\rho)$, f(M)=0 if [P, A⊗B]=0 (e.g., if A and B commute) and f(M)=1 otherwise. That is, the average noise $\varepsilon_{avg}$ can get twirled over $P_2$ and become a Pauli channel $\tilde{\varepsilon}_{avg}$. On the other hand, any difference between $\varepsilon_+$ and $\varepsilon_-$ can produce a non-Pauli component $\tilde{\varepsilon}_{\text{diff}}$ in the twirled noise channel.

As used herein, a quantum channel $\mathcal{C}$ is called a Pauli channel if it can be written as $\mathcal{C}(\rho)=\Sigma_i\chi_{ii} P_i\rho P_i$, i.e., if its $\chi$ matrix is diagonal.

As used herein, quantum channels describe all possible physical operation on a quantum system. Mathematically, a quantum channel $\mathcal{C}$ is a completely positive, trace-preserving linear function. It takes a density matrix $\rho$ as input and returns another density matrix $\rho'=\mathcal{C}(\rho)$. Any quantum channel $\mathcal{C}$ on n qubits can be decomposed in terms of n-qubit Paulis $\{P_i\}$ as $\mathcal{C}(\rho)=\Sigma_{ij}\chi_{ij} P_i\rho P_j$ for some matrix $\chi$.

Turning back to continuation of the quantum circuit execution process 700, after application of either $U_\theta$ or $U_{-\theta}$ (e.g., step 708), the execution component 316 can perform another application of the first random gate and the second random gate (e.g., of $M_1^{(i)}\otimes M_2^{(i)}$) to complete execution of the layer i (e.g., step 710).

Thereafter, the execution component 316 can execute additional layers 2 to k, each having the form of the layer i (e.g., layer 1), but where for each additional layer 2 to k, each of $M_1^{(i)}$ and $M_2^{(i)}$ are selected uniformly at random from {I, X, Y, Z}. That is, the first random gate of each circuit layer of the one or more circuit layers is determined independently of each other circuit layer of the one or more circuit layers, and the second random gate of each circuit layer is determined independently of each other circuit layer of the one or more circuit layers.

Figure 8:
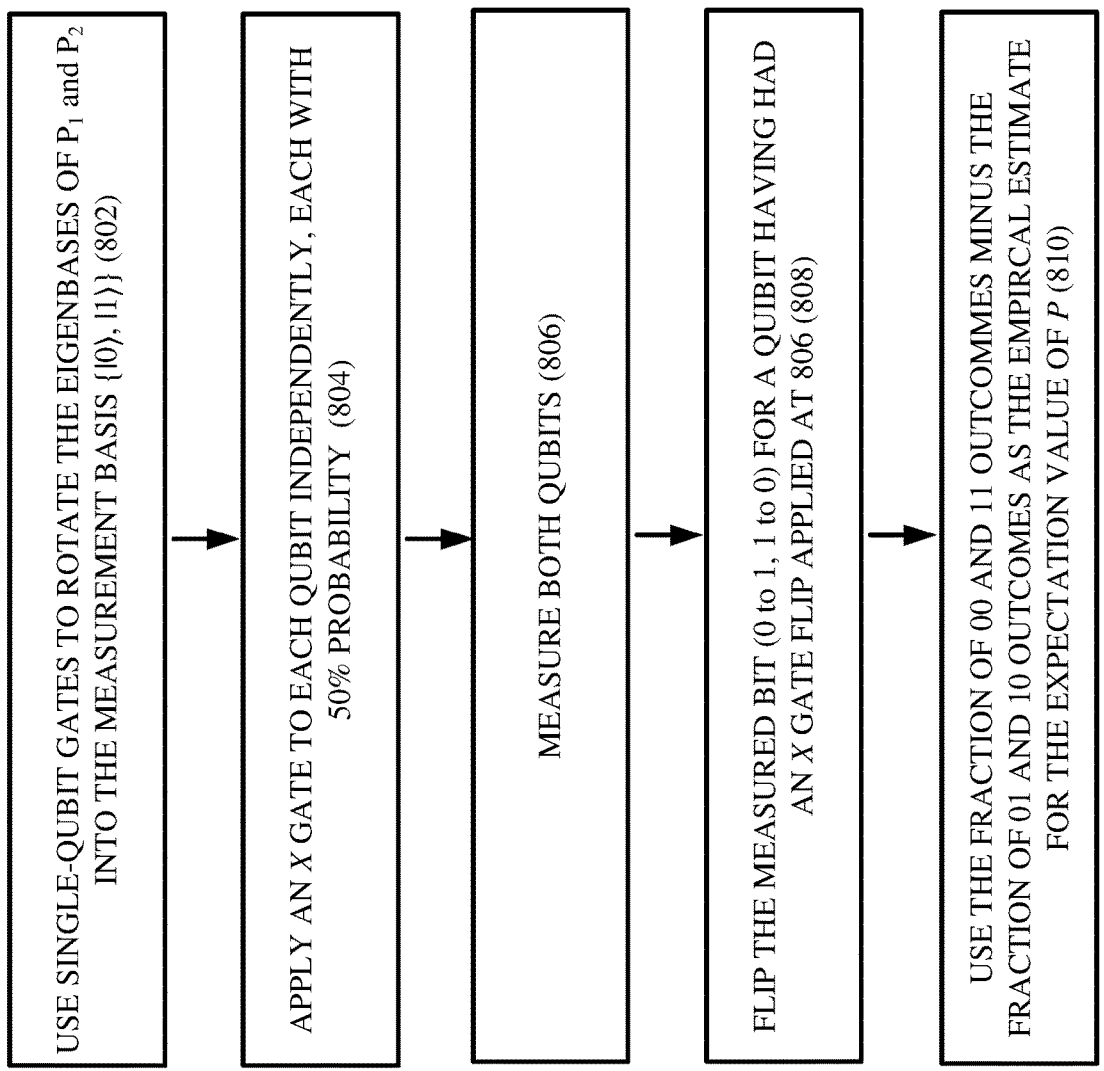
FIG. 8 illustrates still another schematic diagram of example operations that can be performed by the unitary noise characterization system of FIG. 3, in accordance with one or more embodiments described herein.

Turning next to the measurement component 318 at FIG. 3 and also to the expectation value measurement process 800 at FIG. 8, the measurement component 318 can generally measure the expectation value of the selected two-qubit Pauli operator P, such as using readout twirling (e.g., in connection with step 406 of FIG. 4). That is, the measurement component 318 can generally measure the expectation value of P resulting from a full execution of the quantum circuit represented by the circuit diagram 610.

In further detail, this measuring can be performed by first using single-qubit gates to rotate the eigenbases of $P_1$ and $P_2$ (e.g., of the selected Pauli operator P, where P=$P_1\otimes P_2\in$ {I, X, Y, Z}$^{\otimes 2}$) into the measurement basis {|0⟩, |1⟩ } (e.g., step 802). An X gate can then be applied to each qubit, of the two qubits being employed, with a 50% probability being applied independently to each qubit (e.g., step 804). Next, each qubit can be measured at step 806. If a qubit had an X gate applied, flipping of the measured bit (0↔1) for that qubit can be performed (e.g., step 808) and the result can be recorded, such as at memory 304. Finally, the measurement component 318 can use the fraction of 00 and 11 outcomes minus the fraction of 01 and 10 outcomes as the empirical estimate for the expectation value of P (e.g., step 810). This can be represented by the equation:

$$E_P(k) = \frac{\text{number of 00 outcomes} + \text{number of 11 outcomes} - \text{number of 01 outcomes} + \text{number of 10 outcomes}}{\text{total number of measurements}}.$$

It is noted that when two qubits are measured, the four possible outcomes are 00, 01, 10 and 11. An expectation value result of the measuring can be referred to as $E_P(k)$.

Figure 9:
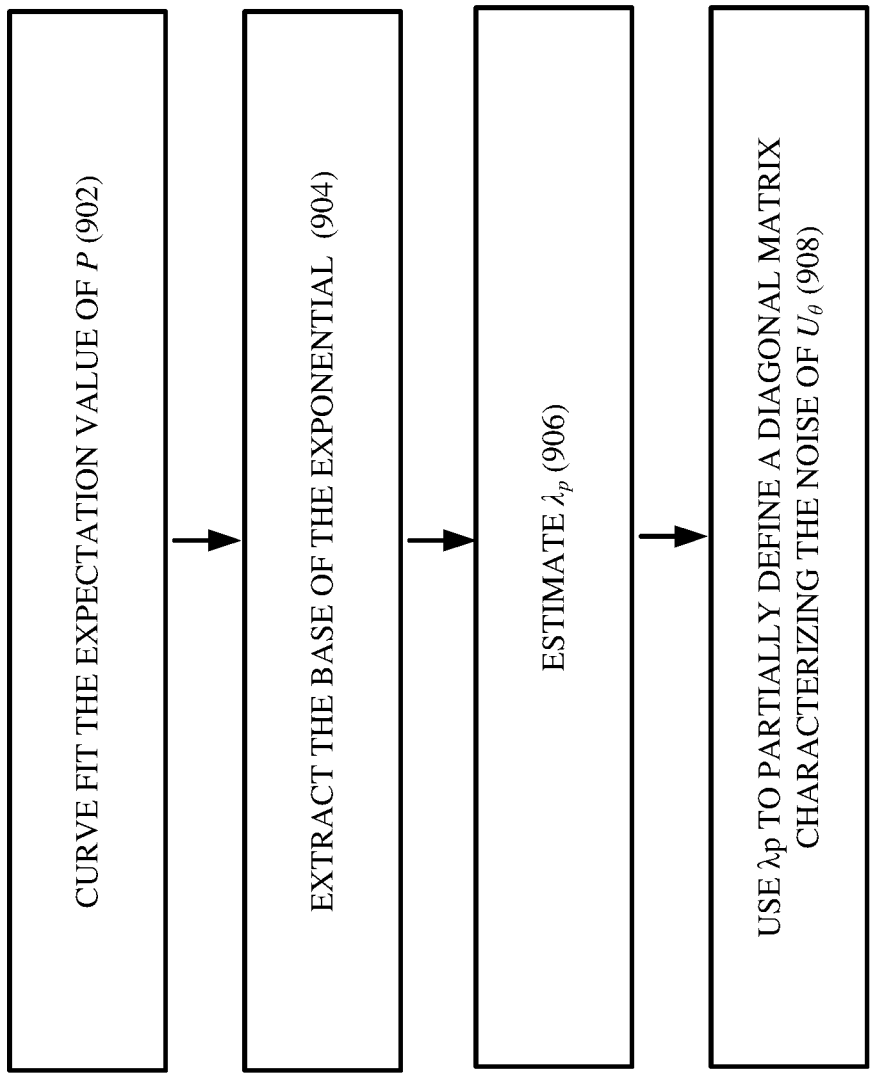
FIG. 9 illustrates another schematic diagram of example operations that can be performed by the unitary noise characterization system of FIG. 3, in accordance with one or more embodiments described herein.

Turning next to the fitting component 320 at FIG. 3 and also to the curve fitting process 900 at FIG. 9, the preparation fitting component 320 can generally employ curve fitting of the resultant expectation value $E_P(k)$, of the two-qubit Pauli operator P, resulting from the execution of the two-qubit quantum circuit 340 (e.g., in connection with step 408 of FIG. 4). The fitting component 320 further can extract one or more parameters (e.g., $b_P$) from the curve fitting and uses the one or more parameters (e.g., $b_P$) to define a diagonal of a matrix $\varepsilon$ at least partially characterizing the noise associated with the two-qubit unitary. This defining can comprise estimating the respective eigenvalue $\lambda_P$ (e.g., elements on the diagonal of $\varepsilon$), which value itself can be employed to define the diagonal of the matrix $\varepsilon$.

That is, in more detail, at step 902, the expectation value $E_P(k)$ can be curve fit, such as to $a_P \times b_P^k$, where $b_P$ is the base of the exponential and a is another parameter. The parameter $b_P$ can then be extracted by the fitting component 320 (e.g., step 904). Next, at step 906, the parameter $\lambda_P$ can be estimated by $b_P$ if [P, A⊗B]=0 (e.g., if A and B commutes) and by $b_P/\cos(\theta)$ if {P, A⊗B}=0 (e.g., if A and B anti-commute). The diagonal of the matrix $\varepsilon$ can be partially defined based on the estimation of $\lambda_P$ (e.g., step 908), e.g., based on the selected P, although additional iterations of the noise characterization process are to be performed for each of the other sixteen values P associated with the sixteen numbers $\lambda_P$ describing the diagonal of the matrix $\varepsilon$.

Figure 10:
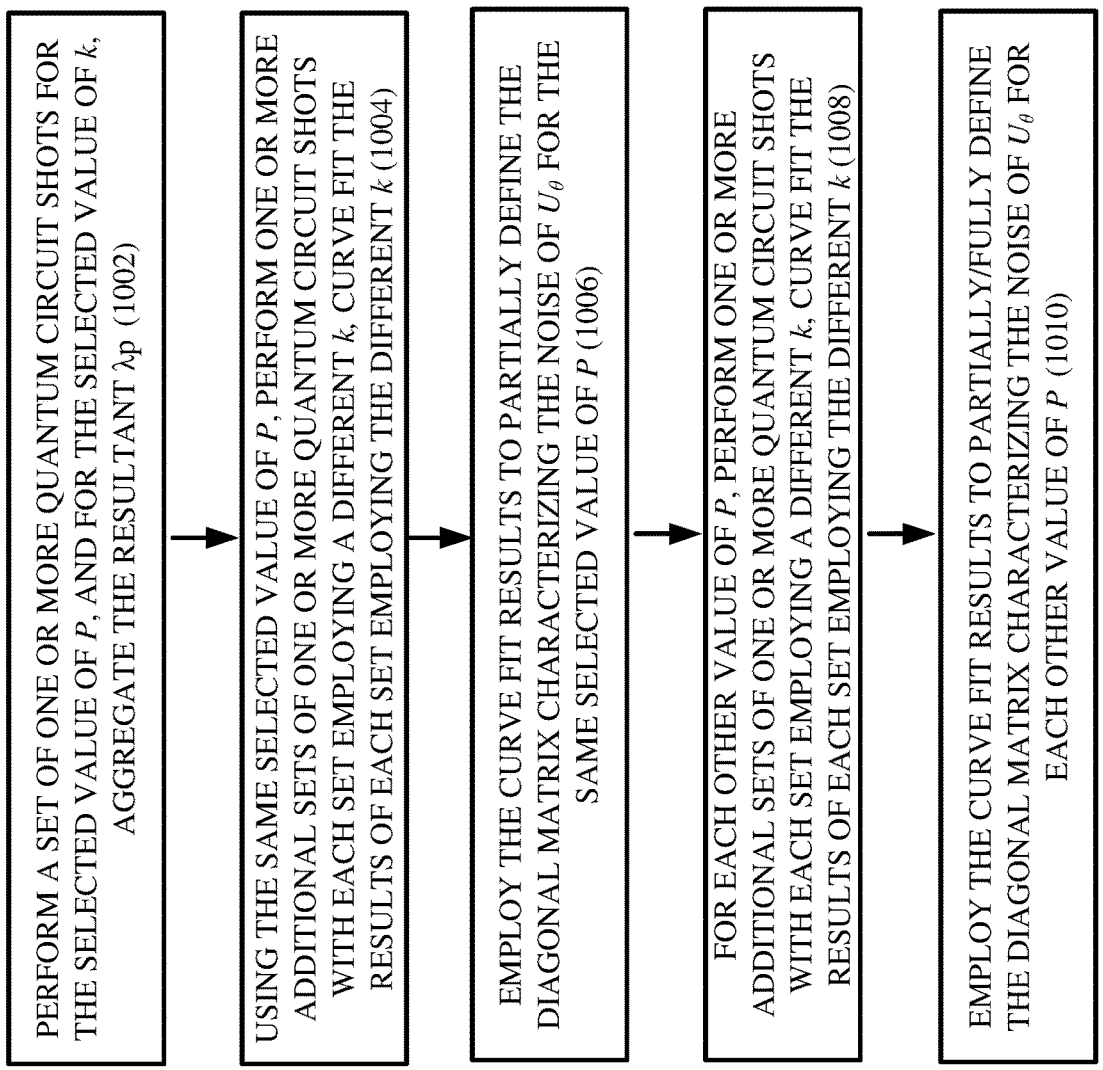
FIG. 10 illustrates yet another schematic diagram of example operations that can be performed by the unitary noise characterization system of FIG. 3, in accordance with one or more embodiments described herein.

That is turning next to FIG. 10, one or more additional steps can be performed to fully define the diagonal of the matrix $\varepsilon$, and thus to full characterize the gate noise caused by execution of the quantum gate 340 ($U_\theta$).

Step 1002 can be optionally performed, such as to provide a better estimation of $E_P(k)$, and thus of $\lambda_P$, for the selected value of P. That is, additional iterations of the above processes of FIG. 4, e.g., additional shots, can be performed (e.g., by the execution component 316) for the selected value of P, and for the same selected value of k. In one or more embodiments, the plural $E_P(k)$ can be graphed/curve fit with a single better approximation of $\lambda_P$ resulting therefrom (e.g., by the fitting component 320).

As used herein, a shot can be defined as execution of step 400 of overall noise characterization method 400, and thus of execution of steps 704, 706, 708 and 710 of the quantum circuit execution process 700.

Whether or not step 1002 is performed, steps 1004-1010 can be performed to further characterize the gate noise caused by execution of the quantum gate 340 ($U_\theta$).

For example, at step 1004, using the same selected value of P, the execution component 316 can perform one or more additional sets of one or more quantum circuit shots for each set, with each set employing a different k. In connection therewith, the measurement component 318 can perform expectation value measurements and the fitting component can curve fit the results of each set employing the different k.

At step 1006, the fitting component 320 can employ the curve fit results to better partially define the diagonal of the matrix ε for the same selected value of P.

At step 1008, where P was $P^1$, for each other value of P, $P^2$ to $P^{16}$ (e.g., determined by the preparation component 314), the execution component 316 can perform one or more additional sets of one or more quantum circuit shots with each set employing a different k. In connection therewith, for each other value of P, $P^2$ to $P^{16}$, the measurement component 318 can perform expectation value measurements and the fitting component can curve fit the results of each set employing the different k.

At step 1010, for each other value of P, $P^2$ to $P^{16}$, the fitting component 320 can employ the curve fit results to better at least partially, and/or substantially fully, define the diagonal of the matrix ε for each other value of P, $P^2$ to $P^{16}$ (e.g., in connection with step 410 of FIG. 4). Such aggregation can comprise averaging.

Based on the output of FIG. 10, the application component 322 can generally apply the partially- and/or fully-defined noise characterization of the gate noise caused by execution of the quantum gate 340 ($U_\theta$), such as during execution of a quantum circuit (e.g., based on a quantum job request 224) that uses the quantum gate 340 ($U_\theta$). For example, the noise characterization can be employed to mitigate and/or fully cancel the gate noise caused by execution of the quantum gate 340 ($U_\theta$).

In summary, the above described one or more system and/or method embodiments allow for approximately characterizing the twirled noise channel $\tilde{\varepsilon}_{avg}$ of a non-Clifford gate and is insensitive to SPAM errors. The one or more embodiments can function ideally when the non-Pauli part $\tilde{\varepsilon}_{diff}$ is zero (e.g., when $\varepsilon_+$ and $\varepsilon_-$ are equal). Otherwise the one or more embodiments can provide an approximation to $\tilde{\varepsilon}_{avg}$, the accuracy of which can depend on a size of $\tilde{\varepsilon}_{diff}$ (it is more/less accurate when $\varepsilon_+$ and $\varepsilon_-$ are respectively more/less similar).

That is, since $\tilde{\varepsilon}_{avg}$ is a Pauli channel, it can be fully described by its eigenvalues $\{\lambda_P\}$ where $\tilde{\varepsilon}_{avg}(P) = \lambda_P P$. It is summarily noted that a scheme that could allow for measuring $c\,\lambda_P^k$ for different values of k and some constant c (i.e., some coefficient that does not vary with k), such as is the case with Clifford gates, would allow for full characterization of $\tilde{\varepsilon}_{avg}$ in a SPAM-robust way. However, an issue is that both $U_\theta$ and $U_{-\theta}$ act in complicated ways on certain Paulis P. That is:

$$U_{\pm\theta} P U_{\pm\theta}^\dagger = P\cos\left(\frac{\theta}{2}\right)^2 \pm i[P, A\otimes B]\sin\left(\frac{\theta}{2}\right)\cos\left(\frac{\theta}{2}\right) + (A\otimes B)P(A\otimes B)\sin\left(\frac{\theta}{2}\right)^2.$$

However, if $U_\theta$ or $U_{-\theta}$ are applied at random, each with 50% probability, as described in the one or more embodiments above, a net effect on P can become less complex as:

$$\frac{1}{2}U_\theta P U_\theta^\dagger + \frac{1}{2}U_{-\theta} P U_{-\theta}^\dagger = \begin{cases} P & \text{if } [P, A\otimes B] = 0 \\ P\cos(\theta) & \text{if }\{P, A\otimes B\} = 0 \end{cases}.$$

Further, If $\varepsilon_+ = \varepsilon_-$, and there were no SPAM errors, the final expectation value $\langle P \rangle$ for this family of circuits would be $c_P \lambda_P^k$ if $[P, A\otimes B]=0$ and $c_P \cos(\theta)^k \lambda_P^k$ if $\{P, A\otimes B\}=0$, where $c_P = \text{tr}(P\rho)$ is the expectation value of P with respect to the initial state $\rho$, which is nonzero. Therefore, this scheme would accurately characterize $\tilde{\varepsilon}_{avg}$.

If $\varepsilon_+ = \varepsilon_-$, but there were SPAM errors, the result would be the same except that $c_P$ would be different constants depending on the average SPAM errors. However, these constants do not bias the estimates of $\{\lambda_P\}$, so the above described scheme/framework still characterizes $\tilde{\varepsilon}_{avg}$ in a SPAM-robust way.

In the general case, with no assumptions about $\varepsilon_+$, $\varepsilon_-$, or SPAM errors, the inferred noise channel would be $\tilde{\varepsilon}_{inf} = \tilde{\varepsilon}_{avg} + \tilde{\varepsilon}_{diff}\mathcal{D}$.

On average, regardless of SPAM errors, where $$\mathcal{D}(\rho) = \frac{i}{2}\tan(\theta)[\rho, A\otimes B].$$

Recall that the twirled gate noise channel is $\tilde{\varepsilon}_{avg} + \tilde{\varepsilon}_{diff}$ in general. Therefore, the above described scheme/framework is a SPAM-robust way to approximately characterize this noise when $\varepsilon_+ \approx \varepsilon_-$ (so $\tilde{\varepsilon}_{diff}$ is small), and it becomes exact (e.g., ideal) when $\varepsilon_+ = \varepsilon_-$ (so $\tilde{\varepsilon}_{diff} = 0$).

It is noted that the above described scheme/framework breaks down when $\cos(\theta)=0$, i.e., when $U_\theta$ becomes a Clifford. In other words, while existing techniques work well in the Clifford case, the one or more embodiments described herein covers a much broader set of non-Clifford gates (e.g., for all angles $|\theta|\neq\pi/2$).

Indeed, these mathematical observations underly the noise characterization framework described at the one or more embodiments above.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In another summary, systems, computer-implemented methods, and/or computer program products to facilitate noise characterization of a two-qubit unitary are provided. A system can comprise a memory that stores computer executable components and a processor that executes the computer executable components stored in the memory. The computer executable components can comprise an execution component that executes a two-qubit quantum circuit comprising a preparation of an initial state for a two-qubit Pauli operator and an application of one or more circuit layers, wherein each circuit layer comprises an application of a pair of random gates each selected from I, X, Y or Z, application of the two-qubit unitary having a rotation angle modified to have a 50% probability of being each of positive and negative, and another application of the first random gate and the second random gate. A fitting component employs curve fitting of an expectation value resulting from the execution.

An advantage of such system can be that the system is state preparation and measurement (SPAM)-robust, and further is compatible with and functions for non-Clifford gates. Such non-Clifford gates are those of $R_{zz}(\Theta)$-type gates for general angles. This can allow for implementation of non-Clifford operations, such as in Trotter and variation circuits, of the form $$U_\theta = \exp(-\frac{i\theta}{2} A \otimes B)$$

for angles $|\theta| \neq \pi/2$ and single-qubit Pauli operators A, B $\in$ {X, Y, Z}.

As a result of noise characterization provided by the aforementioned system, a quantum circuit employing the two-qubit quantum unitary of interest can be executed with reduced noise, thus allowing for greater accuracy in an output of a quantum circuit employing the two-qubit quantum unitary.

Indeed, in view of the one or more embodiments described herein, a practical application of the one or more systems, computer program products and/or computer-implemented methods described herein can be ability to execute a quantum circuit employing the quantum gate of interest, while mitigating noise of the quantum gate of interest, where the quantum gate of interest is a non-Clifford gate. As a result, less complex quantum circuits can be employed using non-Clifford gates, while still having noise characterization and noise-mitigation (e.g., error-mitigation for noise) being available. In view thereof, results of such quantum circuit execution can be provided with greater accuracy in the respective output, due to the reduction and/or elimination of quantum gate noise relative to the quantum gate of interest. This is a useful and practical application of computers, thus providing enhanced (e.g., improved and/or optimized) operation of the hardware and/or software components of a target system (e.g., quantum system). Overall, such tools can constitute a concrete and tangible technical and/or physical improvement in the field of quantum computing.

Furthermore, one or more embodiments described herein can be employed in a real-world system based on the disclosed teachings. For example, one or more embodiments described herein can function in connection with a classical and/or quantum system to solve one or more real-world problems, such as related to fields of chemistry, physics and/or biology. Such problems can be represented as quantum algorithms, which quantum algorithms can be executed as one or more quantum circuits representing the quantum algorithms. In one example, a quantum system can receive as input a quantum job request and can measure a real-world qubit state of one or more qubits, such as superconducting qubits, of the quantum system by operating one or more gates of a quantum circuit, where the one or more quantum gates can have quantum gate noise associated therewith mitigated by one or more frameworks described herein.

Moreover, a device and/or method described herein can be implemented in one or more domains to enable scaled quantum circuit execution and/or scaled quantum gate noise characterization. Indeed, one or more quantum gates can have noise therewith characterized at least partially in parallel with one another. Likewise, one or more quantum circuits can employ error mitigation (based on the noise characterization described herein) for one or more quantum gates at least partially in parallel with one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to quantum circuit execution, as compared to existing systems and/or techniques. Systems, computer-implemented methods and/or computer program products facilitating performance of these processes are of great utility in the field of quantum circuit execution and/or quantum algorithm execution and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively characterize noise of a quantum gate, including execution of the quantum gate to perform the noise characterization, as the one or more embodiments described herein can facilitate this process. And, neither can the human mind nor a human with pen and paper perform one or more of these processes/operations, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 11:
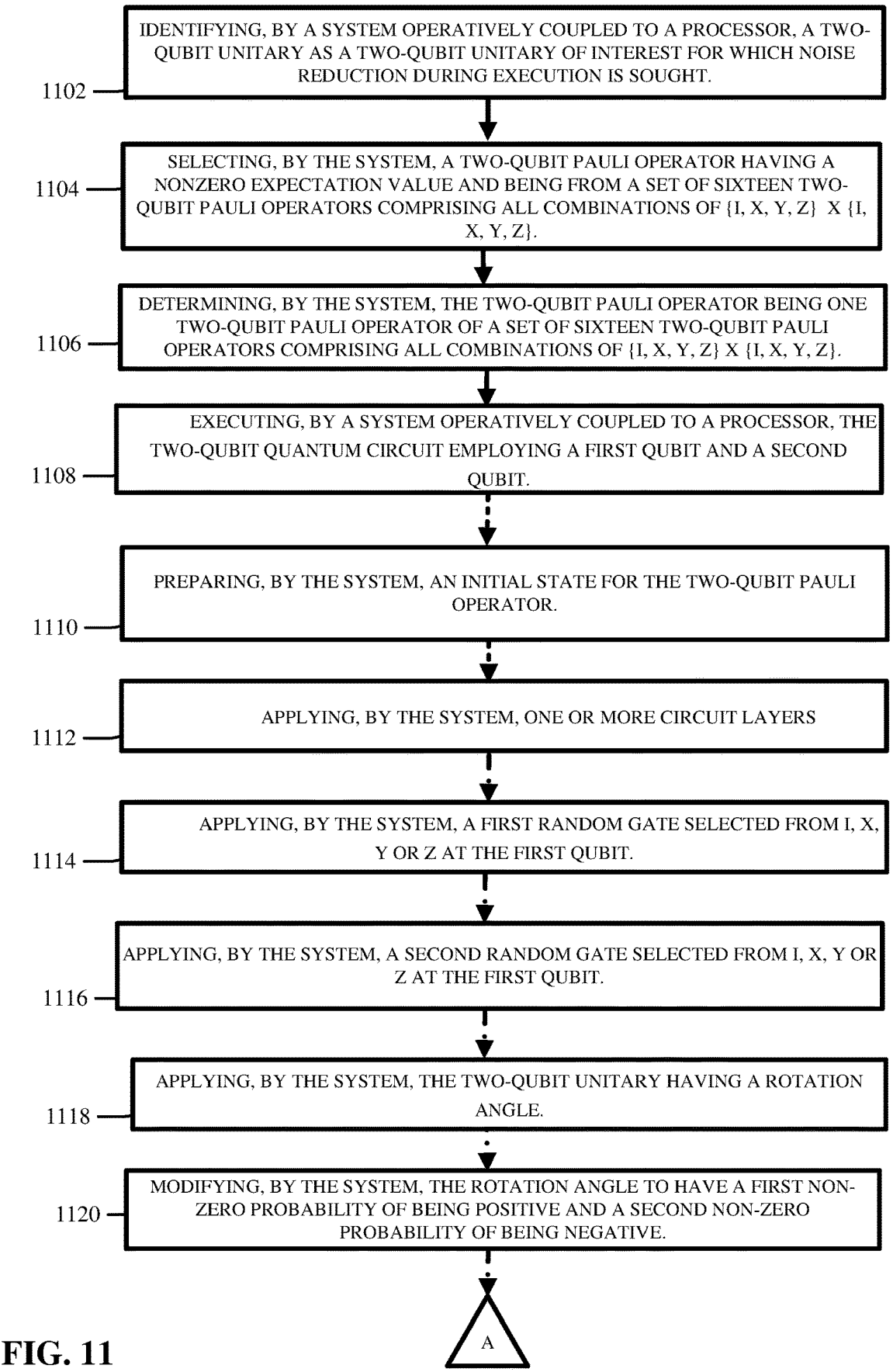
FIG. 11 illustrates a flow diagram of an example, non-limiting computer-implemented method that can facilitate unitary noise characterization, in accordance with one or more embodiments described herein.
Figure 12:
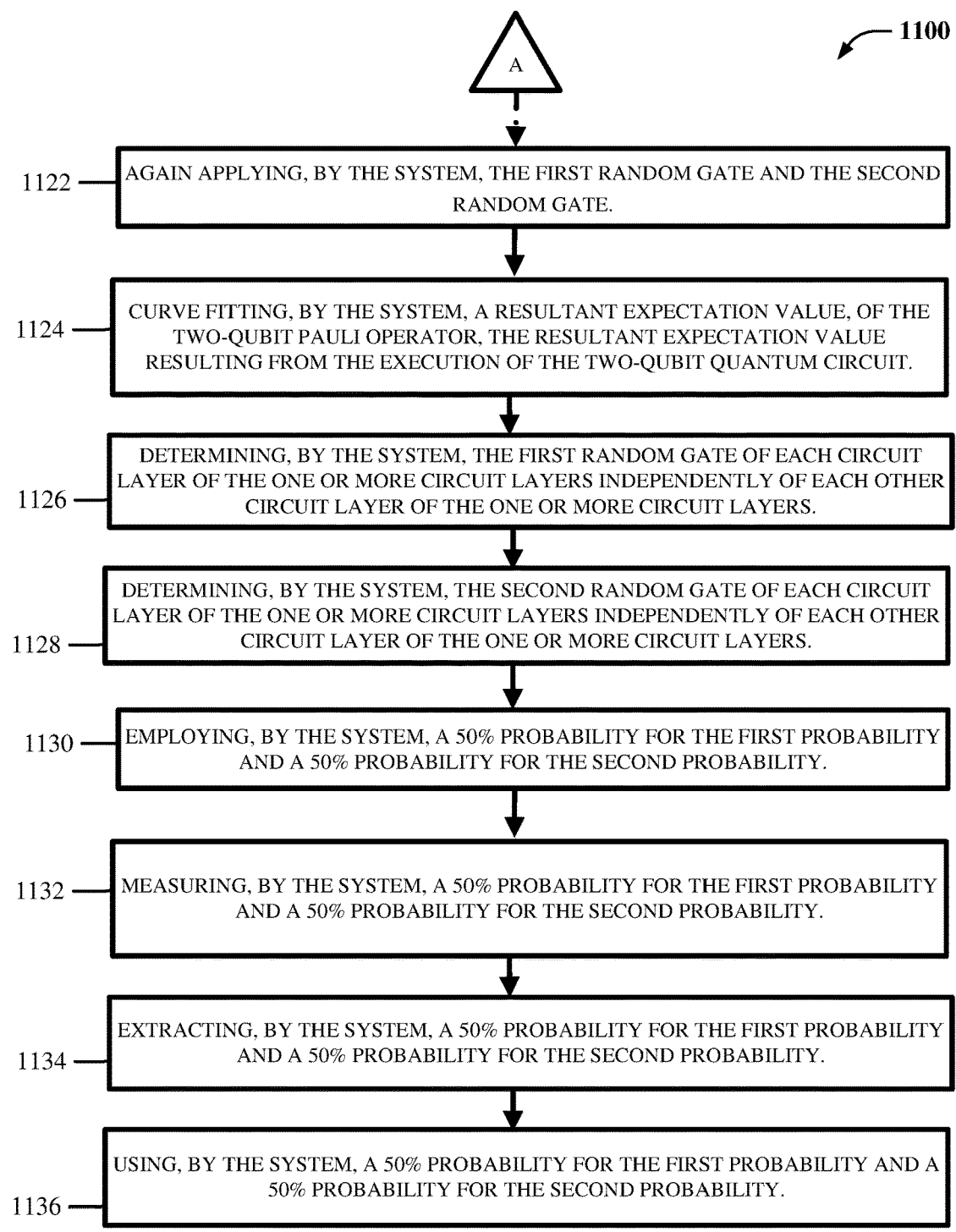
FIG. 12 illustrates a continuation of the flow diagram of FIG. 11, of an example, non-limiting computer-implemented method that can facilitate unitary noise characterization, in accordance with one or more embodiments described herein.

Referring now to FIGS. 11 and 12, illustrated is a flow diagram of an example, non-limiting method 1100 that can provide a process characterize gate noise of a quantum such, such as a non-Clifford gate, such as via the quantum gate noise characterization system 302 of FIG. 3, in accordance with one or more embodiments described herein. While the non-limiting method 1100 is described relative to the quantum gate noise characterization system 302 of FIG. 3, the non-limiting method 1100 can be applicable also to other systems described herein, such as the quantum gate noise characterization system 102 of FIG. 1. Repetitive description of like elements and/or processes employed in respective embodiments is omitted for the sake of brevity.

At 1102, the non-limiting method 1100 can comprise identifying, by a system operatively coupled to a processor (e.g., identification component 312), a two-qubit unitary as a two-qubit unitary of interest for which noise reduction during execution is sought.

At 1104, the non-limiting method 1100 can comprise selecting, by the system (e.g., preparation component 314), a two-qubit Pauli operator having a nonzero expectation value and being from a set of sixteen two-qubit Pauli operators comprising all combinations of $\{I, X, Y, Z\} \otimes \{I, X, Y, Z\}$.

At 1106, the non-limiting method 1100 can comprise determining, by the system (e.g., execution component 316), the two-qubit Pauli operator being one two-qubit Pauli operator of a set of sixteen two-qubit Pauli operators comprising all combinations of $\{I, X, Y, Z\} \otimes \{I, X, Y, Z\}$.

At 1108, the non-limiting method 1100 can comprise executing, by a system operatively coupled to a processor (e.g., execution component 316), the two-qubit quantum circuit employing a first qubit and a second qubit, wherein execution of the two-qubit quantum circuit comprises each of steps 1110 and 1112.

At 1110, the non-limiting method 1100 can comprise preparing, by the system (e.g., preparation component 314), an initial state for the two-qubit Pauli operator.

At 1112, the non-limiting method 1100 can comprise applying, by the system (e.g., execution component 316), one or more circuit layers, wherein applying each circuit layer of the one or more circuit layers comprises each of steps 1114, 1116, 1118, 1120 and 1122.

At 1114, the non-limiting method 1100 can comprise applying, by the system (e.g., execution component 316), a first random gate selected from I, X, Y or Z at the first qubit.

At 1116, the non-limiting method 1100 can comprise applying, by the system (e.g., execution component 316), a second random gate selected from I, X, Y or Z at the first qubit.

At 1118, the non-limiting method 1100 can applying, by the system (e.g., execution component 316), the two-qubit unitary having a rotation angle.

At 1120, the non-limiting method 1100 can comprise modifying, by the system (e.g., execution component 316), the rotation angle to have a first non-zero probability of being positive and a second non-zero probability of being negative.

It is noted that triangle-A denotes a transition between step 1120 at FIG. 11 and step 1122 at FIG. 12.

At 1122, the non-limiting method 1100 can comprise again applying, by the system (e.g., execution component 316), the first random gate and the second random gate.

At 1124, the non-limiting method 1100 can comprise curve fitting, by the system (e.g., execution component 316), a resultant expectation value, of the two-qubit Pauli operator, the resultant expectation value resulting from the execution of the two-qubit quantum circuit.

At 1126, the non-limiting method 1100 can comprise determining, by the system (e.g., execution component 316), the first random gate of each circuit layer of the one or more circuit layers independently of each other circuit layer of the one or more circuit layers.

At 1128, the non-limiting method 1100 can comprise determining, by the system (e.g., execution component 316), the second random gate of each circuit layer of the one or more circuit layers independently of each other circuit layer of the one or more circuit layers.

At 1130, the non-limiting method 1100 can comprise employing, by the system (e.g., execution component 316), a 50% probability for the first probability and a 50% probability for the second probability.

At 1132, the non-limiting method 1100 can comprise measuring, by the system (e.g., execution component 316), a 50% probability for the first probability and a 50% probability for the second probability.

At 1134, the non-limiting method 1100 can comprise extracting, by the system (e.g., execution component 316), a 50% probability for the first probability and a 50% probability for the second probability.

At 1136, the non-limiting method 1100 can comprise using, by the system (e.g., execution component 316), a 50% probability for the first probability and a 50% probability for the second probability.

Figure 13:
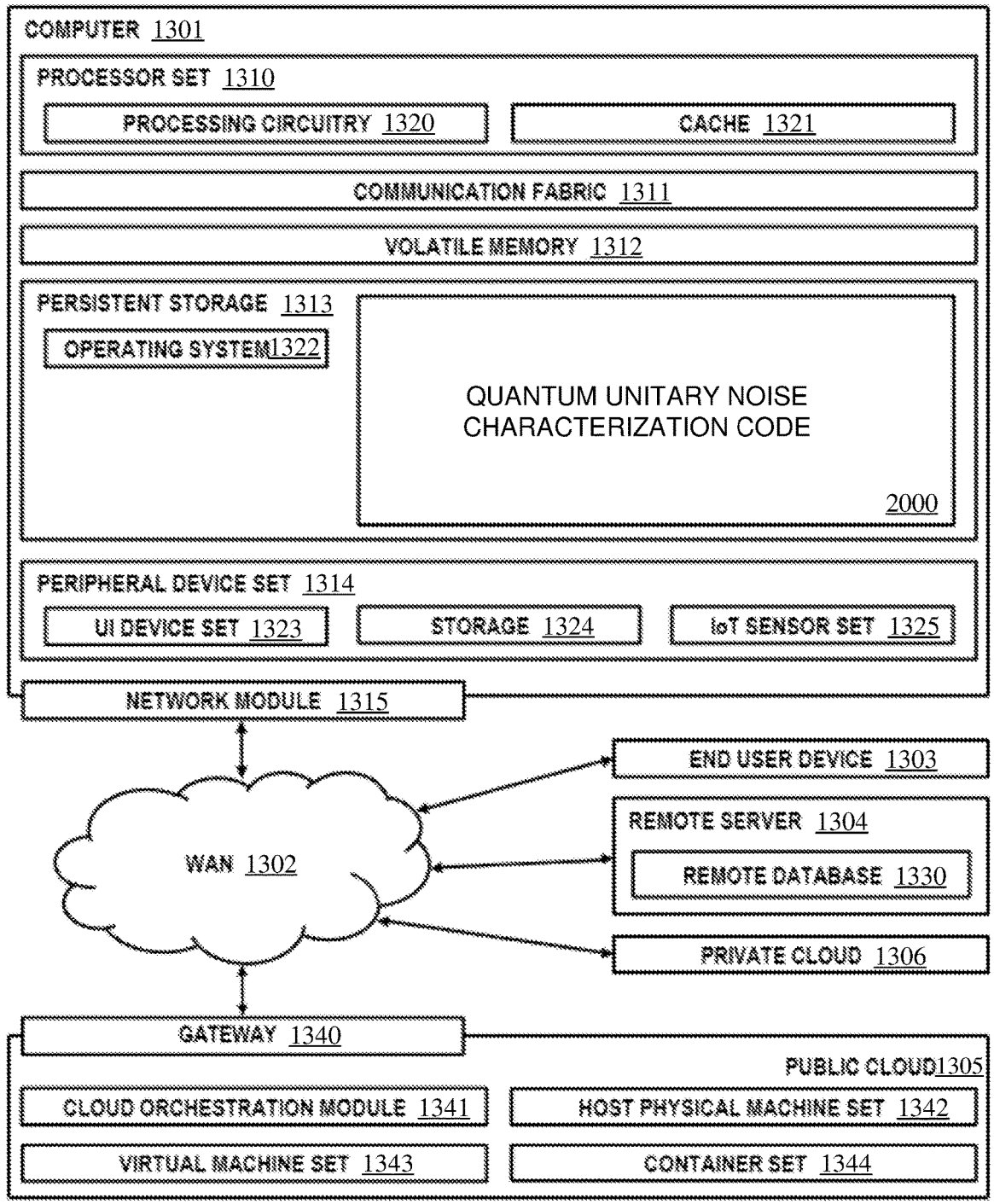
FIG. 13 illustrates a block diagram of example, non-limiting, computer environment in accordance with one or more embodiments described herein.

Turning next to FIG. 13, a detailed description is provided of additional context for the one or more embodiments described herein at FIGS. 1-12.

FIG. 13 and the following discussion are intended to provide a brief, general description of a suitable computing environment 1300 in which one or more embodiments described herein at FIGS. 1-12 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1300 contains an example of an environment for the execution of at least some of the computer code involved in performing the inventive methods, such as translation of an original source code based on a configuration of a target system by the quantum gate noise characterization code 2000. In addition to block 2000, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 2000, as identified above), peripheral device set 1314 (including user interface (UI), device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

COMPUTER 1301 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method can be distributed among multiple computers and/or between multiple locations. On the other hand, in this presentation of computing environment 1300, detailed discussion is focused on a single computer, specifically computer 1301, to keep the presentation as simple as possible. Computer 1301 can be located in a cloud, even though it is not shown in a cloud in FIG. 13. On the other hand, computer 1301 is not required to be in a cloud except to any extent as can be affirmatively indicated.

PROCESSOR SET 1310 includes one, or more, computer processors of any type now known or to be developed in the future. Processing circuitry 1320 can be distributed over multiple packages, for example, multiple, coordinated integrated circuit chips. Processing circuitry 1320 can implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set can be located "off chip." In some computing environments, processor set 1310 can be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods can be stored in block 2000 in persistent storage 1313.

COMMUNICATION FABRIC 1311 is the signal conduction path that allows the various components of computer 1301 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1312 is any type of volatile memory now known or to be developed in the future. Examples include dynamic type random access memory (RAM) or static type RAM. Typically, the volatile memory is characterized by random access, but this is not required unless affirmatively indicated. In computer 1301, the volatile memory 1312 is located in a single package and is internal to computer 1301, but, alternatively or additionally, the volatile memory can be distributed over multiple packages and/or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 can be a read only memory (ROM), but typically at least a portion of the persistent storage allows writing of data, deletion of data and re-writing of data. Some familiar forms of persistent storage include magnetic disks and solid-state storage devices. Operating system 1322 can take several forms, such as various known proprietary operating systems or open-source Portable Operating System Interface type operating systems that employ a kernel. The code included in block 2000 typically includes at least some of the computer code involved in performing the inventive methods.

PERIPHERAL DEVICE SET 1314 includes the set of peripheral devices of computer 1301. Data communication connections between the peripheral devices and the other components of computer 1301 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1323 can include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 can be persistent and/or volatile. In some embodiments, storage 1324 can take the form of a quantum computing storage device for storing data in the form of qubits. In embodiments where computer 1301 is required to have a large amount of storage (for example, where computer 1301 locally stores and manages a large database) then this storage can be provided by peripheral storage devices designed for storing large amounts of data, such as a storage area network (SAN) that is shared by multiple, geographically distributed computers. IoT sensor set 1325 is made up of sensors that can be used in Internet of Things applications. For example, one sensor can be a thermometer and another sensor can be a motion detector.

NETWORK MODULE 1315 is the collection of computer software, hardware, and firmware that allows computer 1301 to communicate with other computers through WAN 1302. Network module 1315 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301) and can take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 can be a client device, such as thin client, heavy client, mainframe computer and/or desktop computer.

REMOTE SERVER 1304 is any computer system that serves at least some data and/or functionality to computer 1301. Remote server 1304 can be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data can be provided to computer 1301 from remote database 1330 of remote server 1304.

PUBLIC CLOUD 1305 is any computer system available for use by multiple entities that provides on-demand availability of computer system resources and/or other computer capabilities, especially data storage (cloud storage) and computing power, without direct active management by the scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs can be stored as images and can be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware and firmware allowing public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

Further aspects of various embodiments described herein are provided by the subject matter of the following clauses:

1. A system, comprising:
    a memory that stores computer executable components; and
    a processor that executes the computer executable components stored in the memory for determining characterization of noise associated with a two-qubit unitary, wherein the computer executable components comprise:
        an execution component that executes a two-qubit quantum circuit employing a first qubit and a second qubit, the two-qubit quantum circuit comprising a preparation of an initial state for a two-qubit Pauli operator and an application of one or more circuit layers, wherein each circuit layer of the one or more circuit layers comprises an application of a first random gate selected from I, X, Y or Z at the first qubit, an application of a second random gate selected from I, X, Y or Z at the second qubit, application of the two-qubit unitary having a rotation angle, wherein the rotation angle is modified to have a first non-zero probability of being positive and a second non-zero probability of being negative, and another application of the first random gate and the second random gate; and
        a fitting component that employs curve fitting of a resultant expectation value, of the two-qubit Pauli operator, the resultant expectation value resulting from the execution of the two-qubit quantum circuit.

2. The system of the preceding clause, wherein the first random gate of each circuit layer of the one or more circuit layers is determined independently of each other circuit layer of the one or more circuit layers, and wherein the second random gate of each circuit layer is determined independently of each other circuit layer of the one or more circuit layers.

3. The system of any preceding clause, wherein the two-qubit unitary is a two-qubit non-Clifford unitary.

4. The system of any preceding clause, wherein the first probability is 50%, and wherein the second probability is 50%.

5. The system of any preceding clause, wherein the two-qubit Pauli operator has a nonzero expectation value and is selected from a set of sixteen two-qubit Pauli operators comprising all combinations of $\{I, X, Y, Z\} \otimes \{I, X, Y, Z\}$.

6. The system of any preceding clause, wherein the fitting component further extracts one or more parameters from the curve fitting and uses the one or more parameters to define a diagonal of a matrix at least partially characterizing the noise associated with the two-qubit unitary.

7. The system of any preceding clause, further comprising:
    a measurement component that measures the resultant expectation value of the two-qubit Pauli operator using readout twirling.

8. The system of any preceding clause, further comprising:
    an identification component that identifies the two-qubit unitary as a two-qubit unitary of interest for which noise reduction during execution is sought; and
    a preparation component that determines the two-qubit Pauli operator being an element of a set of sixteen two-qubit Pauli operators comprising all combinations of $\{I, X, Y, Z\} \otimes \{I, X, Y, Z\}$ for the preparation of the initial state and that prepares the preparation of the initial state 9. The system of any preceding clause, wherein the execution component executes the two-qubit quantum circuit, being a first two-qubit quantum circuit, comprising application of a first number of the one or more circuit layers, and wherein the execution component further executes one or more additional two-qubit quantum circuits, each comprising application of the initial state for the two-qubit Pauli operator and each comprising application of a number of the one or more circuit layers, wherein each number is different from the first number and from one another.

10. The system of the preceding clause, wherein the execution component executes the two-qubit quantum circuit and the one or more additional two-qubit quantum circuits together being a first set of two-qubit quantum circuits, and wherein the execution component further executes one or more additional sets of two-qubit quantum circuits, each in the same manner of execution of the first set of two-qubit quantum circuits, but for each individual set of the one or more additional sets, having each two-qubit quantum circuit thereof comprising applying another initial state, wherein the initial state and each of the another initial states is prepared for a different two-qubit Pauli operator of a set of sixteen two-qubit Pauli operators comprising all combinations of $\{I, X, Y, Z\} \otimes \{I, X, Y, Z\}$.

11. A computer program product facilitating a process for noise characterization of a two-qubit unitary, the computer program product comprising a computer readable storage medium having program instructions embodied therewith, the program instructions executable by a processor to cause the processor to:

execute, by the processor, a two-qubit quantum circuit employing a first qubit and a second qubit, comprising
applying, by the processor, one or more circuit layers, wherein applying each circuit layer of the one or more circuit layers comprises
applying, by the processor, a first random gate selected from I, X, Y or Z at the first qubit,
applying, by the processor, a second random gate selected from I, X, Y or Z at the second qubit,
applying, by the processor, the two-qubit unitary having a rotation angle that is modified to have a 50% probability of being positive and a 50% probability of being negative, and
again applying, by the processor, the first random gate and the second random gate; and
measure, by the processor, a resultant expectation value of a two-qubit Pauli operator, the resultant expectation value resulting from the execution of the two-qubit quantum circuit, using readout twirling, wherein the two-qubit Pauli operator at least partially defines a diagonal of a matrix at least partially characterizing the noise associated with the two-qubit unitary.

12. The computer program product of the preceding clause, wherein the program instructions are executable by the processor to further cause the processor to:
extract, by the processor, one or more parameters from a curve fitting of the resultant expectation value; and
use, by the processor, the one or more parameters to define the diagonal of the matrix.

13. The computer program product of any preceding clause, wherein the program instructions are executable by the processor to further cause the processor to:
determine, by the processor, the first random gate of each circuit layer of the one or more circuit layers independently of each other circuit layer of the one or more circuit layer; and
determine, by the processor, the second random gate of each circuit layer of the one or more circuit layers independently of each other circuit layer of the one or more circuit layers.

14. The computer program product of any preceding clause, wherein the program instructions are executable by the processor to further cause the processor to:
prepare, by the processor, an initial state for the two-qubit Pauli operator that is one two-qubit Pauli operator of a set of sixteen two-qubit Pauli operators comprising all combinations of $\{I, X, Y, Z\} \otimes \{I, X, Y, Z\}$; and
execute, by the processor the two-qubit quantum circuit further comprising
applying, by the processor, the initial state.

15. A computer-implemented method for noise characterization of a two-qubit unitary, comprising:
executing, by a system operatively coupled to at least one processor, a two-qubit quantum circuit employing a first qubit and a second qubit, wherein execution of the two-qubit quantum circuit comprises
preparing, by the system, an initial state for a two-qubit Pauli operator, and
applying, by the system, one or more circuit layers, wherein applying each circuit layer of the one or more circuit layers comprises
applying, by the system, a first random gate selected from I, X, Y or Z at the first qubit,
applying, by the system, a second random gate selected from I, X, Y or Z at the second qubit,
applying, by the system, the two-qubit unitary having a rotation angle,
modifying, by the system, the rotation angle to have a first non-zero probability of being positive and a second non-zero probability of being negative, and
again applying, by the system, the first random gate and the second random gate; and
curve fitting, by the system, a resultant expectation value, of the two-qubit Pauli operator, the resultant expectation value resulting from the execution of the two-qubit quantum circuit.

16. The computer-implemented method of the preceding clause, further comprising:
determining, by the system, the first random gate of each circuit layer of the one or more circuit layers independently of each other circuit layer of the one or more circuit layers, and
determining, by the system, the second random gate of each circuit layer of the one or more circuit layers independently of each other circuit layer of the one or more circuit layers.

17. The computer-implemented method of any preceding clause, wherein the two-qubit unitary is a two-qubit non-Clifford unitary, wherein the first probability is 50%, and wherein the second probability is 50%.

18. The computer-implemented method of any preceding clause, further comprising:
selecting, by the system the two-qubit Pauli operator having a nonzero expectation value and being from a set of sixteen two-qubit Pauli operators comprising all combinations of $\{I, X, Y, Z\} \otimes \{I, X, Y, Z\}$.

19. The computer-implemented method of any preceding clause, further comprising:
identifying, by the system, the two-qubit unitary as a two-qubit unitary of interest for which noise reduction during execution is sought; and
determining, by the system, the two-qubit Pauli operator being one two-qubit Pauli operator of a set of sixteen two-qubit Pauli operators comprising all combinations of $\{I, X, Y, Z\} \otimes \{I, X, Y, Z\}$.

20. The computer-implemented method of any preceding clause, further comprising:
measuring, by the system, the resultant expectation value of the two-qubit Pauli operator using readout twirling;
extracting, by the system, one or more parameters from the curve fitting; and
using, by the system, the one or more parameters to define a diagonal of a matrix at least partially characterizing the noise associated with the two-qubit unitary.

21. A system, comprising:
a memory that stores computer executable components; and
a processor that executes the computer executable components stored in the memory for determining characterization of noise associated with a two-qubit non-Clifford unitary, wherein the computer executable components comprise:
an execution component that executes a two-qubit quantum circuit employing a first qubit and a second qubit, the two-qubit quantum circuit comprising an application one or more circuit layers, wherein each circuit layer of the one or more circuit layers comprises an application of a first random gate selected from I, X, Y or Z at the first qubit, an application of a second random gate selected from I, X, Y or Z at the second qubit, application of the two-qubit unitary having a rotation angle that is modified to have a 50% probability of being positive and a 50% probability of being negative, and another application of the first random gate and the second random gate; and a measurement component that measures a resultant expectation value of a two-qubit Pauli operator, the resultant expectation value resulting from the execution of the two-qubit quantum circuit, using readout twirling, wherein the two-qubit Pauli operator at least partially defines a diagonal of a matrix at least partially characterizing the noise associated with the two-qubit unitary.

22. The system of the preceding clause, further comprising:
a fitting component that extracts one or more parameters from a curve fitting of the resultant expectation value and uses the one or more parameters to define the diagonal of the matrix.

23. The system of any preceding clause, further comprising:
a preparation component that prepares an initial state for the two-qubit Pauli operator which is one two-qubit Pauli operator of a set of sixteen two-qubit Pauli operators comprising all combinations of $\{I, X, Y, Z\} \otimes \{I, X, Y, Z\}$, wherein the execution component further executes the two-qubit quantum circuit further comprising the preparation of the initial state.

24. The system of any preceding clause, wherein the first random gate of each circuit layer of the one or more circuit layers is determined independently of each other circuit layer of the one or more circuit layers, and wherein the second random gate of each circuit layer is determined independently of each other circuit layer of the one or more circuit layers.

25. The system of any preceding clause, wherein the two-qubit Pauli operator has a nonzero expectation value and is selected from a set of sixteen two-qubit Pauli operators comprising all combinations of $\{I, X, Y, Z\} \otimes \{I, X, Y, Z\}$.

What is claimed is:

1. A system, comprising:
a memory that stores computer executable components; and
a processor that executes the computer executable components stored in the memory for determining characterization of noise associated with a two-qubit unitary, wherein the computer executable components comprise:
an execution component that executes a two-qubit quantum circuit employing a first qubit and a second qubit, the two-qubit quantum circuit comprising a preparation of an initial state for a two-qubit Pauli operator and an application of one or more circuit layers, wherein each circuit layer of the one or more circuit layers comprises an application of a first random gate selected from I, X, Y or Z at the first qubit, an application of a second random gate selected from I, X, Y or Z at the second qubit, application of the two-qubit unitary having a rotation angle, wherein the rotation angle is modified to have a first non-zero probability of being positive and a second non-zero probability of being negative, and another application of the first random gate and the second random gate; and
a fitting component that employs curve fitting of a resultant expectation value, of the two-qubit Pauli operator, the resultant expectation value resulting from the execution of the two-qubit quantum circuit.

2. The system of claim 1, wherein the first random gate of each circuit layer of the one or more circuit layers is determined independently of each other circuit layer of the one or more circuit layers, and wherein the second random gate of each circuit layer is determined independently of each other circuit layer of the one or more circuit layers.

3. The system of claim 1, wherein the two-qubit unitary is a two-qubit non-Clifford unitary.

4. The system of claim 1, wherein the first probability is 50%, and wherein the second probability is 50%.

5. The system of claim 1, wherein the two-qubit Pauli operator has a nonzero expectation value and is selected from a set of sixteen two-qubit Pauli operators comprising all combinations of $\{I, X, Y, Z\} \otimes \{I, X, Y, Z\}$.

6. The system of claim 1, wherein the fitting component further extracts one or more parameters from the curve fitting and uses the one or more parameters to define a diagonal of a matrix at least partially characterizing the noise associated with the two-qubit unitary.

7. The system of claim 1, further comprising:
a measurement component that measures the resultant expectation value of the two-qubit Pauli operator using readout twirling.

8. The system of claim 1, further comprising:
an identification component that identifies the two-qubit unitary as a two-qubit unitary of interest for which noise reduction during execution is sought; and
a preparation component that determines the two-qubit Pauli operator being an element of a set of sixteen two-qubit Pauli operators comprising all combinations of $\{I, X, Y, Z\} \otimes \{I, X, Y, Z\}$ for the preparation of the initial state and that prepares the preparation of the initial state.

9. The system of claim 1, wherein the execution component executes the two-qubit quantum circuit, being a first two-qubit quantum circuit, comprising application of a first number of the one or more circuit layers, and wherein the execution component further executes one or more additional two-qubit quantum circuits, each comprising application of the initial state for the two-qubit Pauli operator and each comprising application of a number of the one or more circuit layers, wherein each number is different from the first number and from one another.

10. The system of claim 9, wherein the execution component executes the two-qubit quantum circuit and the one or more additional two-qubit quantum circuits together being a first set of two-qubit quantum circuits, and wherein the execution component further executes one or more additional sets of two-qubit quantum circuits, each in the same manner of execution of the first set of two-qubit quantum circuits, but for each individual set of the one or more additional sets, having each two-qubit quantum circuit thereof comprising applying another initial state, wherein the initial state and each of the another initial states is prepared for a different two-qubit Pauli operator of a set of sixteen two-qubit Pauli operators comprising all combinations of $\{I, X, Y, Z\} \otimes \{I, X, Y, Z\}$.

11. A computer program product facilitating a process for noise characterization of a two-qubit unitary, the computer program product comprising a computer readable storage medium having program instructions embodied therewith, the program instructions executable by a processor to cause the processor to:
execute, by the processor, a two-qubit quantum circuit employing a first qubit and a second qubit, comprising applying, by the processor, one or more circuit layers, wherein applying each circuit layer of the one or more circuit layers comprises
  applying, by the processor, a first random gate selected from I, X, Y or Z at the first qubit,
  applying, by the processor, a second random gate selected from I, X, Y or Z at the second qubit,
  applying, by the processor, the two-qubit unitary having a rotation angle that is modified to have a 50% probability of being positive and a 50% probability of being negative, and
  again applying, by the processor, the first random gate and the second random gate; and
measure, by the processor, a resultant expectation value of a two-qubit Pauli operator, the resultant expectation value resulting from the execution of the two-qubit quantum circuit, using readout twirling, wherein the two-qubit Pauli operator at least partially defines a diagonal of a matrix at least partially characterizing the noise associated with the two-qubit unitary.

12. The computer program product of claim 11, wherein the program instructions are executable by the processor to further cause the processor to:
  extract, by the processor, one or more parameters from a curve fitting of the resultant expectation value; and
  use, by the processor, the one or more parameters to define the diagonal of the matrix.

13. The computer program product of claim 11, wherein the program instructions are executable by the processor to further cause the processor to:
  determine, by the processor, the first random gate of each circuit layer of the one or more circuit layers independently of each other circuit layer of the one or more circuit layer; and
  determine, by the processor, the second random gate of each circuit layer of the one or more circuit layers independently of each other circuit layer of the one or more circuit layers.

14. The computer program product of claim 11, wherein the program instructions are executable by the processor to further cause the processor to:
  prepare, by the processor, an initial state for the two-qubit Pauli operator that is one two-qubit Pauli operator of a set of sixteen two-qubit Pauli operators comprising all combinations of {I, X, Y, Z}⊗{I, X, Y, Z}; and
  execute, by the processor the two-qubit quantum circuit further comprising
    applying, by the processor, the initial state.

15. A computer-implemented method for noise characterization of a two-qubit unitary, comprising:
  executing, by a system operatively coupled to at least one processor, a two-qubit quantum circuit employing a first qubit and a second qubit, wherein execution of the two-qubit quantum circuit comprises
    preparing, by the system, an initial state for a two-qubit Pauli operator, and
    applying, by the system, one or more circuit layers, wherein applying each circuit layer of the one or more circuit layers comprises
      applying, by the system, a first random gate selected from I, X, Y or Z at the first qubit,
      applying, by the system, a second random gate selected from I, X, Y or Z at the second qubit,
      applying, by the system, the two-qubit unitary having a rotation angle,
      modifying, by the system, the rotation angle to have a first non-zero probability of being positive and a second non-zero probability of being negative, and
      again applying, by the system, the first random gate and the second random gate; and
  curve fitting, by the system, a resultant expectation value, of the two-qubit Pauli operator, the resultant expectation value resulting from the execution of the two-qubit quantum circuit.

16. The computer-implemented method of claim 15, further comprising:
  determining, by the system, the first random gate of each circuit layer of the one or more circuit layers independently of each other circuit layer of the one or more circuit layers, and
  determining, by the system, the second random gate of each circuit layer of the one or more circuit layers independently of each other circuit layer of the one or more circuit layers.

17. The computer-implemented method of claim 15, wherein the two-qubit unitary is a two-qubit non-Clifford unitary, wherein the first probability is 50%, and wherein the second probability is 50%.

18. The computer-implemented method of claim 15, further comprising:
  selecting, by the system, the two-qubit Pauli operator having a nonzero expectation value and being from a set of sixteen two-qubit Pauli operators comprising all combinations of {I, X, Y, Z}⊗{I, X, Y, Z}.

19. The computer-implemented method of claim 15, further comprising:
  identifying, by the system, the two-qubit unitary as a two-qubit unitary of interest for which noise reduction during execution is sought; and
  determining, by the system, the two-qubit Pauli operator being one two-qubit Pauli operator of a set of sixteen two-qubit Pauli operators comprising all combinations of {I, X, Y, Z}⊗{I, X, Y, Z}.

20. The computer-implemented method of claim 15, further comprising:
  measuring, by the system, the resultant expectation value of the two-qubit Pauli operator using readout twirling;
  extracting, by the system, one or more parameters from the curve fitting; and
  using, by the system, the one or more parameters to define a diagonal of a matrix at least partially characterizing the noise associated with the two-qubit unitary.

* * * * *